(12) United States Patent  
Itou

(10) Patent No.: US 11,644,607 B2  
(45) Date of Patent: May 9, 2023

(54) LIGHTING DEVICE AND DISPLAY DEVICE

(71) Applicant: Japan Display Inc., Tokyo (JP)

(72) Inventor: Osamu Itou, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/711,037

(22) Filed: Apr. 1, 2022

(65) Prior Publication Data

US 2022/0229219 A1 Jul. 21, 2022

Related U.S. Application Data

(63) Continuation of application No. PCT/JP2020/032143, filed on Aug. 26, 2020.

(30) Foreign Application Priority Data

Oct. 3, 2019 (JP) .............................. JP2019-182866

(51) Int. Cl.  
*F21V 8/00* (2006.01)  
*G02F 1/1335* (2006.01)  
*G02F 1/13357* (2006.01)

(52) U.S. Cl.  
CPC ........... *G02B 6/0031* (2013.01); *G02B 6/002* (2013.01); *G02B 6/0068* (2013.01); *G02B 6/0073* (2013.01); *G02F 1/133524* (2013.01); *G02F 1/133615* (2013.01)

(58) Field of Classification Search  
CPC .... G02B 6/0031; G02B 6/002; G02B 6/0068; G02B 6/0073; G02F 1/133524; G02F 1/133615  
See application file for complete search history.

(56) References Cited

U.S. PATENT DOCUMENTS

| 8,013,948 | B2 * | 9/2011 | Park ................. G02F 1/133603 |
| | | | 362/633 |
| 9,971,197 | B2 * | 5/2018 | Song ......................... F21V 7/04 |
| 2005/0280752 | A1 * | 12/2005 | Kim .................. G02F 1/133611 |
| | | | 349/62 |
| 2017/0146846 | A1 | 5/2017 | Funakoshi et al. |
| 2020/0326594 | A1 * | 10/2020 | Chang ............... G02F 1/133605 |

FOREIGN PATENT DOCUMENTS

JP 2017-97152 A 6/2017

OTHER PUBLICATIONS

International Search Report and Written Opinion dated Oct. 6, 2020, received for PCT Application PCT/JP2020/032143, Filed on Aug. 26, 2020, 8 pages including English Translation.

* cited by examiner

*Primary Examiner* — Mary Ellen Bowman  
(74) *Attorney, Agent, or Firm* — Xsensus LLP

(57) ABSTRACT

A lighting device includes a first light guide area sandwiched between partitions extending along a first direction, a first light emitting element emitting light in a first wavelength band, and a semi-transmitting reflective film covering the first light guide area, the first light guide area including a first protrusion, and a reflective film covering the first protrusion and each side of the partitions, the first light guide area including, a first part having a constant first width in a second direction crossing the first direction, and a second part adjacent to the first part and the first width decreasing as it recedes from the first part, wherein the first light emitting-element is arranged in the second part.

18 Claims, 23 Drawing Sheets

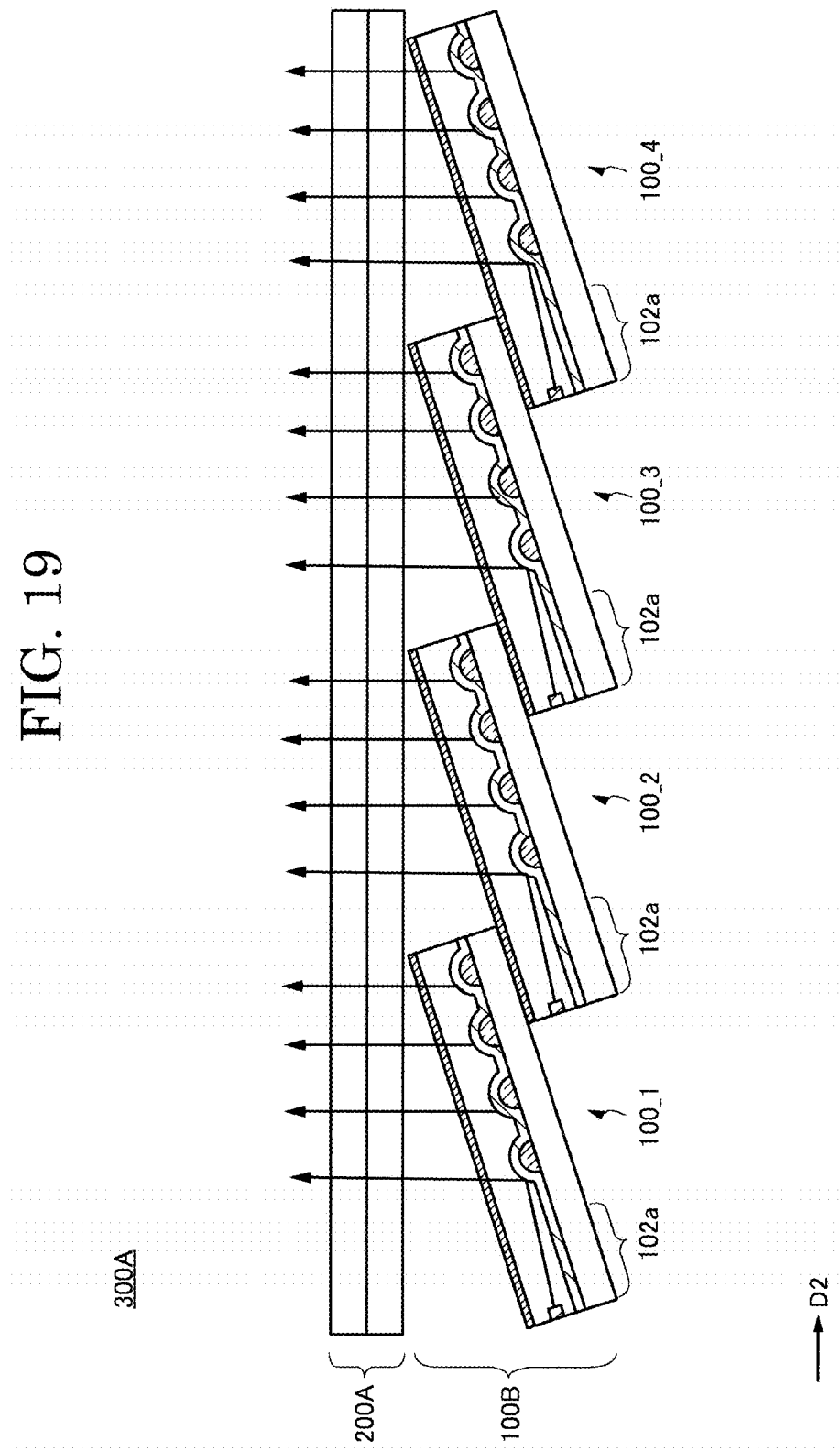

LIGHTING DEVICE AND DISPLAY DEVICE

CROSS-REFERENCE TO RELATED APPLICATIONS

This application is a Continuation of International Patent Application No. PCT/JP2020/032143, filed on Aug. 26, 2020, which claims priority to Japanese Patent Application No. 2019-182866, filed on Oct. 3, 2019, the entire contents of each are incorporated herein by its reference.

FIELD

An embodiment of the present invention relates to a lighting device and a display device with the lighting device.

BACKGROUND

Examples of a display device include a liquid crystal display device and an organic EL (Electroluminescence; EL) display device. The liquid crystal display device includes a liquid crystal element in each of a plurality of pixels formed on a substrate. The liquid crystal element has a liquid crystal layer between a pair of electrodes and is driven by applying a voltage between the pair of electrodes.

An edge light method is mainly used for a backlight for a liquid crystal display device which has a mounting part of a plurality of LEDs (also called a light-emitting element) at a position overlapping one end of the liquid crystal display device. Point-shaped light by the plurality of LEDs is converted into planar light by a light guide plate, a diffusion film, and a reflective film and emitted to the liquid crystal display device (e.g., Japanese Laid-Open Patent No. 2017-97152).

SUMMARY

A lighting device according to an embodiment of the present invention includes a first light guide area sandwiched between partitions extending along a first direction, a first light emitting element emitting light in a first wavelength band, and a semi-transmitting reflective film covering the first light guide area, the first light guide area including a first protrusion, and a reflective film covering the first protrusion and each side of the partitions, the first light guide area including a first part having a constant first width in a second direction crossing the first direction, and a second part adjacent to the first part and the first width decreasing as it recedes from the first part, wherein the first light emitting-element is arranged in the second part.

A display device according to an embodiment of the present invention includes a lighting device and a display panel provided on the lighting device, the lighting device including a first light guide area sandwiched between partitions extending along a first direction, a first light emitting element emitting light in a first wavelength band, and a semi-transmitting reflective film covering the first light guide area, the first light guide area including a first protrusion, and a reflective film covering the first protrusion and each side of the partitions, the first light guide area including a first part having a constant first width in a second direction crossing the first direction, and a second part adjacent to the first part and the first width decreasing as it recedes from the first part, the display panel including a second substrate having a display area including a first pixel and a peripheral area surrounding the display area, and a third substrate provided opposite the display area of the second substrate, wherein the third light-emitting element is arranged in the fifth part, the first part overlaps the display area, and the second part overlaps the peripheral area.

BRIEF DESCRIPTION OF DRAWINGS

FIG. 19 is a cross-sectional view of a display device according to an embodiment of the present invention;

DESCRIPTION OF EMBODIMENTS

In a backlight in a conventional liquid crystal display device, since a color filter provided in a counter substrate absorbs a part of the light emitted from the backlight, there is a problem whereby the brightness decreases.

Therefore, one of the objects of the present embodiment of the present invention is to suppress a decrease in the emission brightness of a light-emitting element in a lighting device.

Embodiments of the present invention will be described below with reference to the drawings. The disclosure is merely an example, and those skilled in the art can easily conceive of appropriate changes while maintaining the spirit of the invention and such changes are naturally included in the scope of the invention. For the sake of clarity of explanation, although the drawings may be schematically represented with respect to widths, thicknesses, shapes, and the like of the respective parts in comparison with actual embodiments, they are merely an example and do not limit the interpretation of the present invention. In this specification and each of the drawings, the same symbols are assigned to the same components as those described above with reference to the above-mentioned drawings, and a detailed description thereof may be omitted as appropriate.

First Embodiment

A lighting device 100 according to an embodiment of the present invention will be described with reference to FIG. 1 to FIG. 13.

<Outline of Lighting Device>

Figure 1:
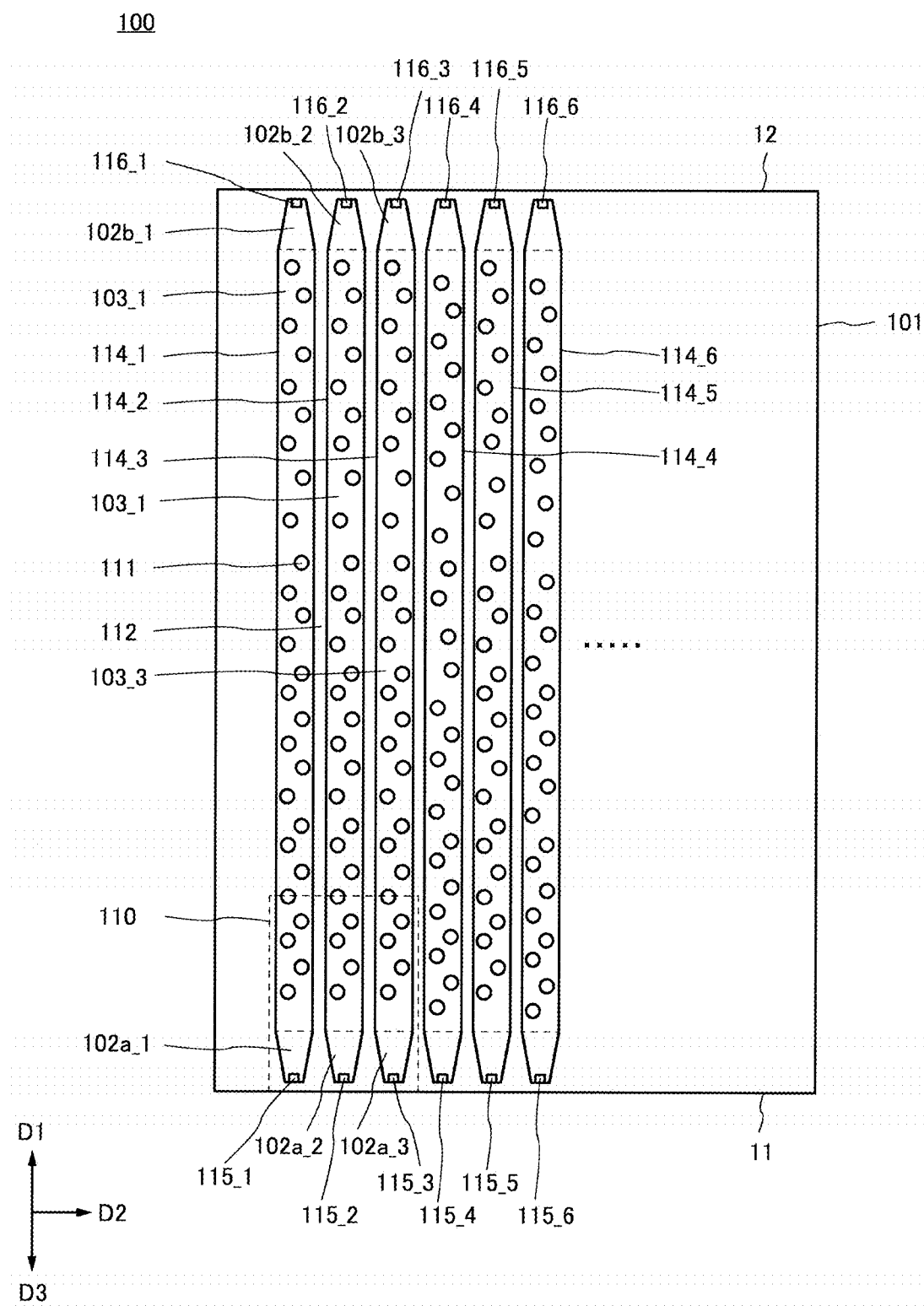
FIG. 1 is a plan view of a lighting device according to an embodiment of the present invention.
Figure 2:
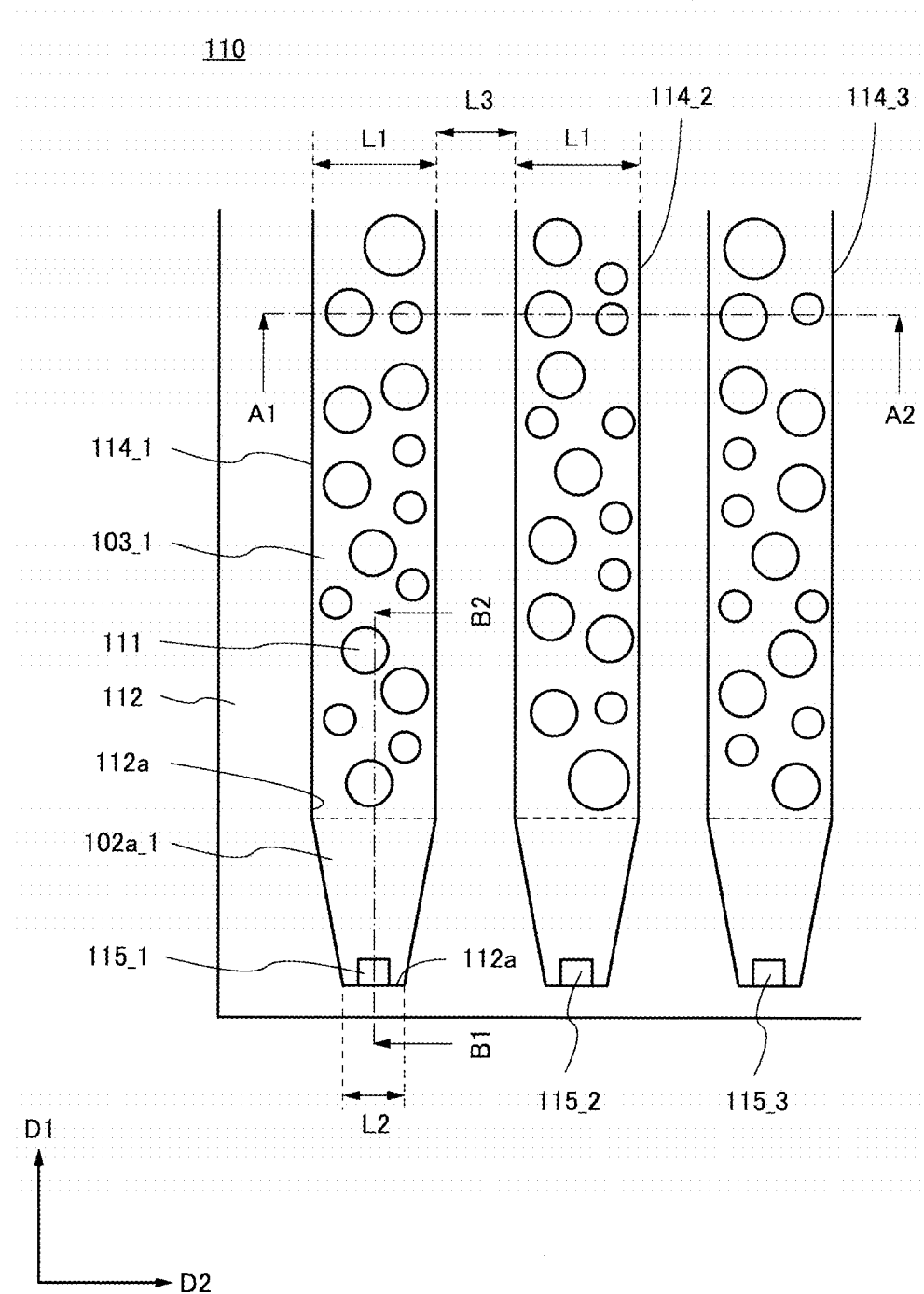
FIG. 2 is an enlarged view of a part of a lighting device according to an embodiment of the present invention.
Figure 3:
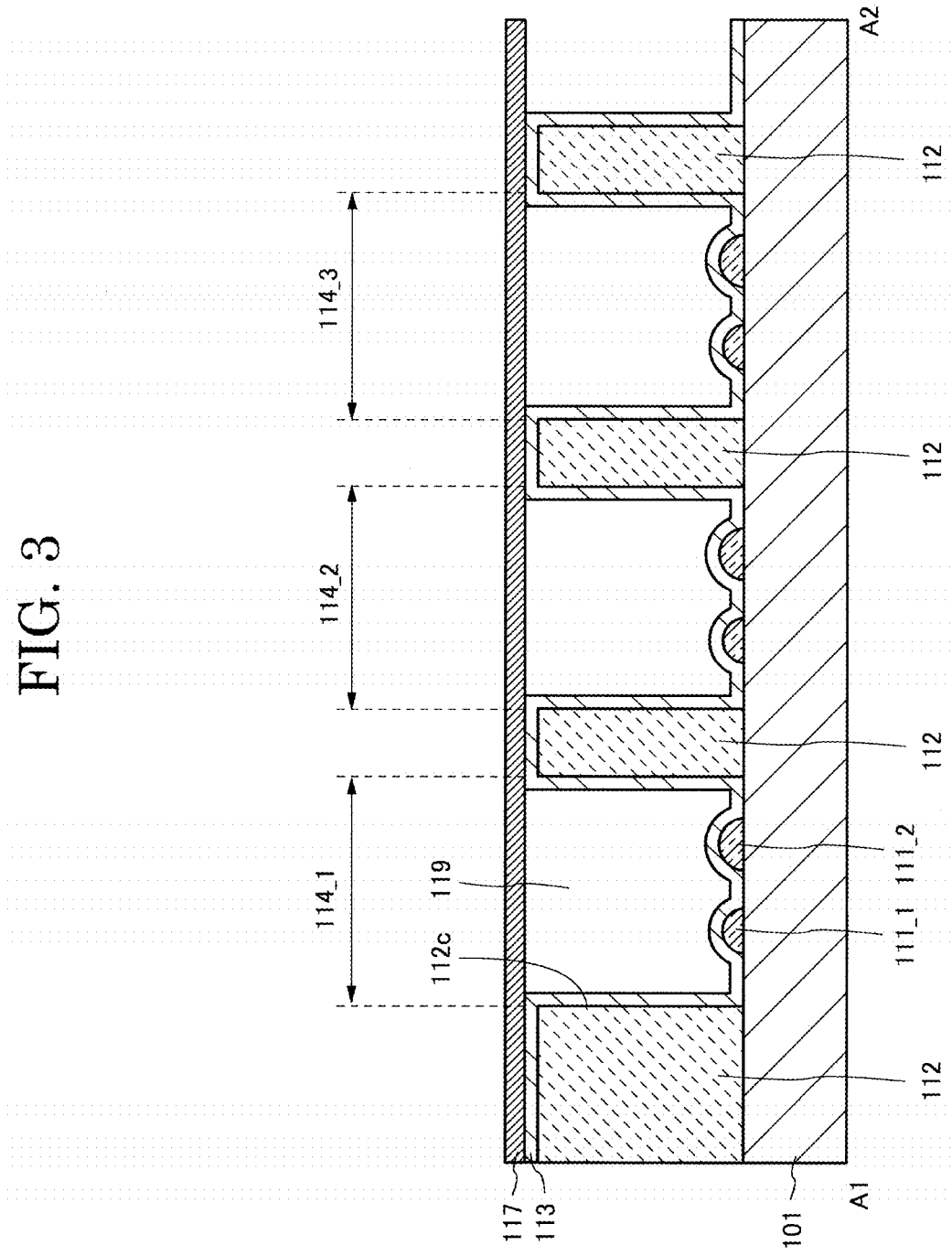
FIG. 3 is a cross-sectional view taken along a line A1-A2 of the lighting device shown in FIG. 2.
Figure 4:
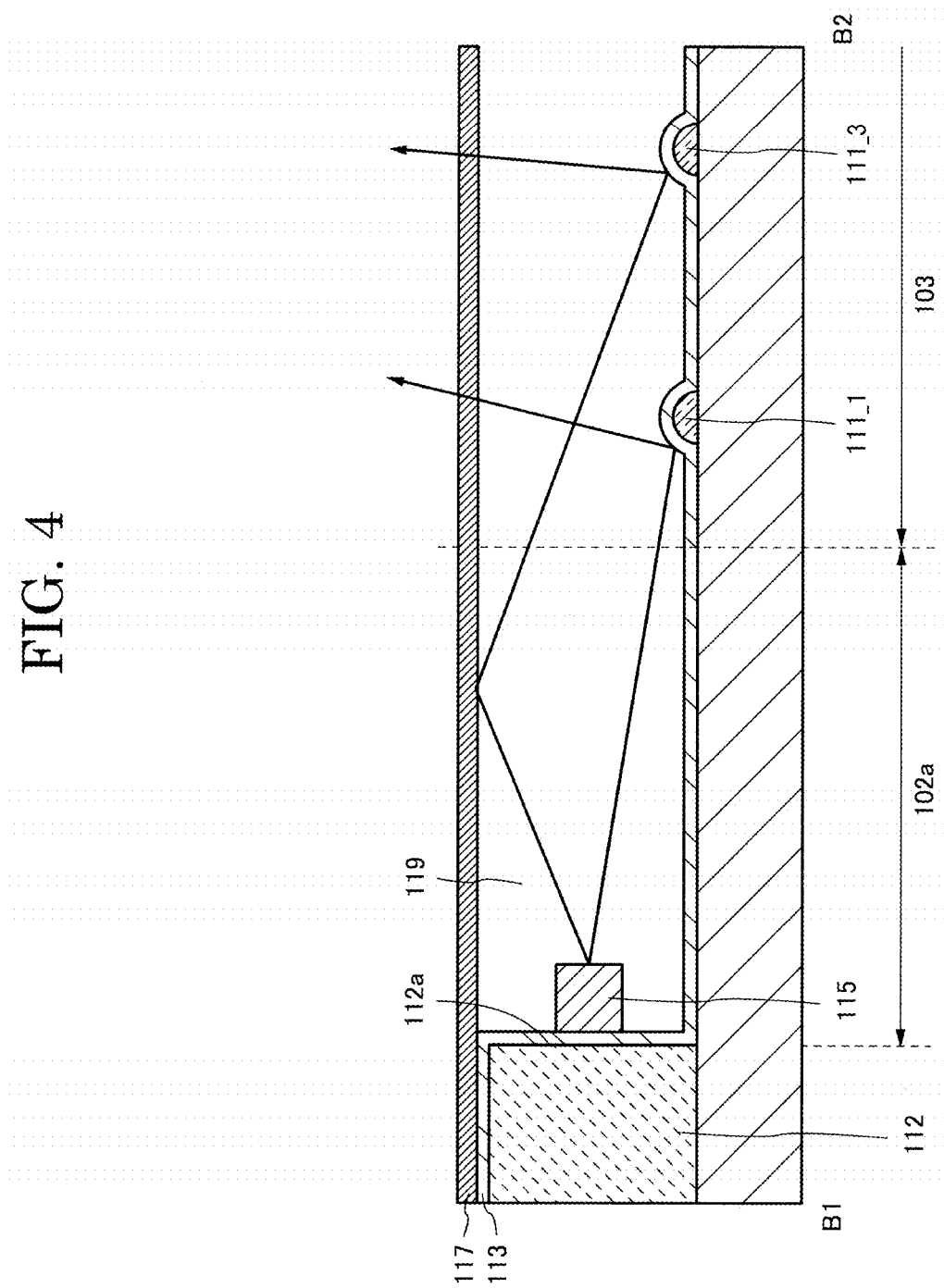
FIG. 4 is a cross-sectional view taken along a line B1-B2 of the lighting device shown in FIG. 2.

FIG. 1 is a plan view of the lighting device 100 according to an embodiment of the present invention. FIG. 2 is an enlarged view of a part 110 of the lighting device 100. FIG. 3 is a cross-sectional view taken along a line A1-A2 of the lighting device 100 shown in FIG. 2. FIG. 4 is a cross-sectional view taken along a line 11-B2 of the lighting device 100 shown in FIG. 2. The lighting device 100 includes a partition 112, a protrusion 111, a reflective film 113, a light-emitting element 115, and a semi-transmitting reflective film 117 provided on a substrate 101.

A plurality of light guide areas 114_1 to 114_6 extends along a first direction D1 on the substrate 101. The partition 112 is provided on the substrate 101 so as to sandwich the regions of each of the plurality of light guide areas 114_1 to 114_6. That is, the plurality of light guide areas 114_1 to 114_6 is a region defined by the substrate 101 and the partition 112. The side surface of the partition 112 is provided so as to be substantially perpendicular to a surface of the substrate 101 (a bottom surface of the light guide area 114). In the following explanation, each of the light guide areas 1141 to 114_6 is referred to as a light guide area 114 unless otherwise distinguished. The same applies to the components of the light guide area 114.

The light guide area 114 has a light-emitting part 103 and light source parts 102a, 102b. As shown in FIG. 2, the light-emitting part 103 is a part where a width L1 in a second direction D2 intersecting the first direction D1 is constant. The width L1 is, for example, 80 μm to 200 μm, or 10 μm to 40 μm. The former is a numerical example applied to a large display device such as a TV, and the latter is a numerical example applied to a medium and small display device such as a smartphone and a tablet. The light source part 102a is a part adjacent to the light-emitting part 103 and its width L1 decreases toward a side 11 of the substrate 101. In the light source part 102a, a part having the smallest width in the second direction D2 is indicated by a width L2. The width L2 is, for example, 40 μm to 100 μm, or 5 μm to 20 μm. The light source part 102b is adjacent to the light-emitting part 103 and its width L1 decreases toward a side 12 facing the side 11 of the substrate 101. In the light source part 102b, the part where the width in the second direction D2 is minimized is the width L2. A distance between the adjacent light guide areas 114_1 and 114_2 is indicated by a width L3. The width L3 is preferably smaller than the width L1.

A light-emitting element 115_1 is provided in a light source part 102a_1. The light-emitting element 115_1 is provided in a part where the width of the light source part 102a_1 in the second direction D2 (width L2) is the smallest. The light-emitting element 115_1 is provided to irradiate a side surface 112a of the partition 112 in the light source part 102a_1 with a first light of the first wavelength band in the first direction D1. For example, the first wavelength band is 610 nm to 750 nm, and the first light is red. A light-emitting element 116_1 is provided in a light source part 102b_1. The light-emitting element 116_1 is provided in a part where the width of the light source part 102b_1 in the second direction D2 (width L2) is the smallest. The light-emitting element 116_1 is provided to face the light-emitting element 115_1. The light-emitting element 116_1 is provided to irradiate a side surface of the partition 112 in the light source part 102b_1 with the first light of the first wavelength band in a third direction D3 opposite to the first direction D1.

For example, mini-LEDs or micro-LEDs are preferably used as the light-emitting elements 115 and 116. The chip size of the mini-LED is, for example, about 100 μm to 200 μm, and the chip size of the micro-LED is less than 100 μm. The light-emitting elements 115, 116 may be selected from mini-LEDs or micro-LEDs according to the width L2 of the light source parts 102a, 102b.

The light guide area 114_2 is adjacent to the light guide area 114_1 in the second direction D2 and extends along the first direction D1. The light guide area 114_2 also includes the light-emitting part 103 and light source parts 102a_2 and 102b_2 in the same manner as the light guide area 114_1. The light source part 102a_2 of the light guide area 114_2 is provided with a light-emitting element 115_2, and the light source part 102b_2 is provided with a light-emitting element 116_2. The light-emitting element 115_2 and the light-emitting element 116_2 emit a second light of a second wavelength band differing from the first wavelength band. For example, the second wavelength band is 500 nm to 560 nm, and the second light is green.

The light guide area 114_3 is adjacent to the light guide area 114_2 in the second direction D2 and extends along the first direction D1. A light source part 102a_3 of the light guide area 114_3 is provided with a light-emitting element 115_3, and a light source part 102b_3 is provided with a light-emitting element 116_3. The light-emitting element 115_3 and the light-emitting element 116_3 emit a third light of a third wavelength band differing from the first wavelength band and the second wavelength band. For example, the third wavelength band is 435 nm to 480 nm, and the third light is blue.

The light-emitting part 103 is provided with a plurality of protrusions 111. The plurality of protrusions 111 is provided at random in the light-emitting part 103. The protrusion 111 has, for example, a polygonal pyramid shape such as a meniscus-shaped shape, cone-shaped, triangular pyramid, or a quadrangular pyramid. In the case where the plurality of protrusions 111 is meniscus-shaped, the diameter thereof is preferably several μm to 10 μm. In the case where the plurality of protrusions 111 is cone-shaped, a diameter of a bottom surface is preferably several μm to 10 μm. Their diameters are preferably sufficiently smaller than the width of the light-emitting part 103. The heights of the plurality of protrusions 111 are preferably about several μm. The areas and heights of the plurality of protrusions 111 may be the same or different from each other.

As shown in FIG. 3, the reflective film 113 is provided on the substrate 101, the partition 112, and the plurality of protrusions 111. The reflective film 113 is formed of a highly reflective metal material such as aluminum or silver. The thickness of the reflective film 113 is preferably, for example, 100 nm to 300 nm. The reflective film 113 is also provided on the side surfaces 112a, 112b, and 112c of the partition 112. As shown in FIG. 4, the light-emitting element 115 is provided on the side surface 112a of the partition 112 via the reflective film 113.

The semi-transmitting reflective film 117 is provided on the light guide area 114, the partition 112, and the light-emitting element 115. By providing the semi-transmitting reflective film 117 on the partition 112, a space 119 is formed by the substrate 101, the partition 112, and the semi-transmitting reflective film 117. Similar to the reflective film 113, the semi-transmitting reflective film 117 is formed of a highly reflective metal material such as aluminum or silver. By thinning the highly reflective metal film such as aluminum or silver, the semi-transmitting reflective film 117 can be provided with light reflectance and light transmittance. The reflectance and transmittance of the semi-transmitting reflective film 117 continuously change in the first direction of the light guide area 114. The semi-transmitting reflective film 117 has a maximum reflectance and a minimum transmittance in the vicinity of the light source parts 102a and 102b and has a minimum reflectance and a maximum transmittance in a region farthest from the light source parts 102a and 102b. That is, in the light guide area 114, it is preferable that the reflectance is at a minimum, and the transmittance is at a maximum in a region between the light-emitting element 115 and light-emitting element 116. In addition, the reflective film 113 preferably has a reflectance of approximately 100% in the light source parts 102a and 102b. As a result, light leakage of the light-emitting element 115 in the light source part 102a can be suppressed. Furthermore, the mixing of emission colors of a plurality of adjacent light-emitting elements 115 (e.g., light-emitting elements 115_1 and 115_2) due to light leakage can be suppressed. As shown in FIG. 3, although the semi-transmitting reflective film 117 is provided over the partition 112 and the space 119, when using a metal thin film as described above, a transparent base material, for example, a thin plate made of glass or resin and the like, or a component formed by laminating a thin metal film on the surface of a film can be used as a semi-transparent reflective film 117.

FIG. 4 is a diagram illustrating an optical path of light emitted from the light-emitting element 115. As shown in FIG. 4, in the space 119, the light emitted from the light-emitting element 115 is reflected by the semi-transmitting reflective film 117 in the light source part 102. The light reflected by the semi-transmitting reflective film 117 is further reflected by the protrusion 111 and emitted from the light-emitting part 103 through the semi-transmitting reflective film 117 to the outside.

The emission intensity of the light-emitting element 115 increases as it is approaches the light-emitting element 115 and decreases as it recedes from the light-emitting element 115. Therefore, it is preferable that the density of the plurality of protrusions 111 per 1000 μm² is low in a region close to the light-emitting element 115 and the density of the plurality of protrusions 111 per 1000 μm² is high in a region further away from the light-emitting element 115. It is possible to make the emission intensity uniform from the entire light-emitting part 103 by making the density of the plurality of protrusions 111 in the region further away from the light-emitting element 115 higher than the density of the plurality of protrusions 111 in the region close to the light-emitting element 115. In the semi-transmitting reflective film 117, it is preferable to make the transmittance of the region further away from the light-emitting element 115 higher than the transmittance of the region close to the light-emitting element 115. Consequently, the light in the region close to the light-emitting element 115 is reflected by the semi-transmitting reflective film 117 and proceeds in the space 119 in the first direction D1. Thereafter, in the region further away from the light-emitting element 115, the light reflected by the protrusion 111 can be efficiently emitted from the semi-transmitting reflective film 117.

The reflectance and transmittance of the semi-transmitting reflective film 117 can be adjusted, for example, by changing the thickness within the region of the semi-transmitting reflective film 117. The thickness of the semi-transmitting reflective film 117 in the intermediate part of the light-emitting part 103 is smaller than the thickness of the semi-transmitting reflective film 117 in the vicinity of the light source part 102a of the light-emitting part 103. For example, the thickness of the semi-transmitting reflective film 117 in the intermediate part of the light-emitting part 103 is set to less than 50 nm, and the thickness of the semi-transmitting reflective film 117 in the vicinity of the light source part 102a of the light-emitting part 103 is set to 50 nm or more and 100 nm or less. The thickness of the semi-transmitting reflective film 117 overlapping the light source part 102a is 100 nm or more and 300 nm or less. It is not necessary that the semi-transmitting reflective film 117 transmit light in the light source part 102a.

Figure 6A:
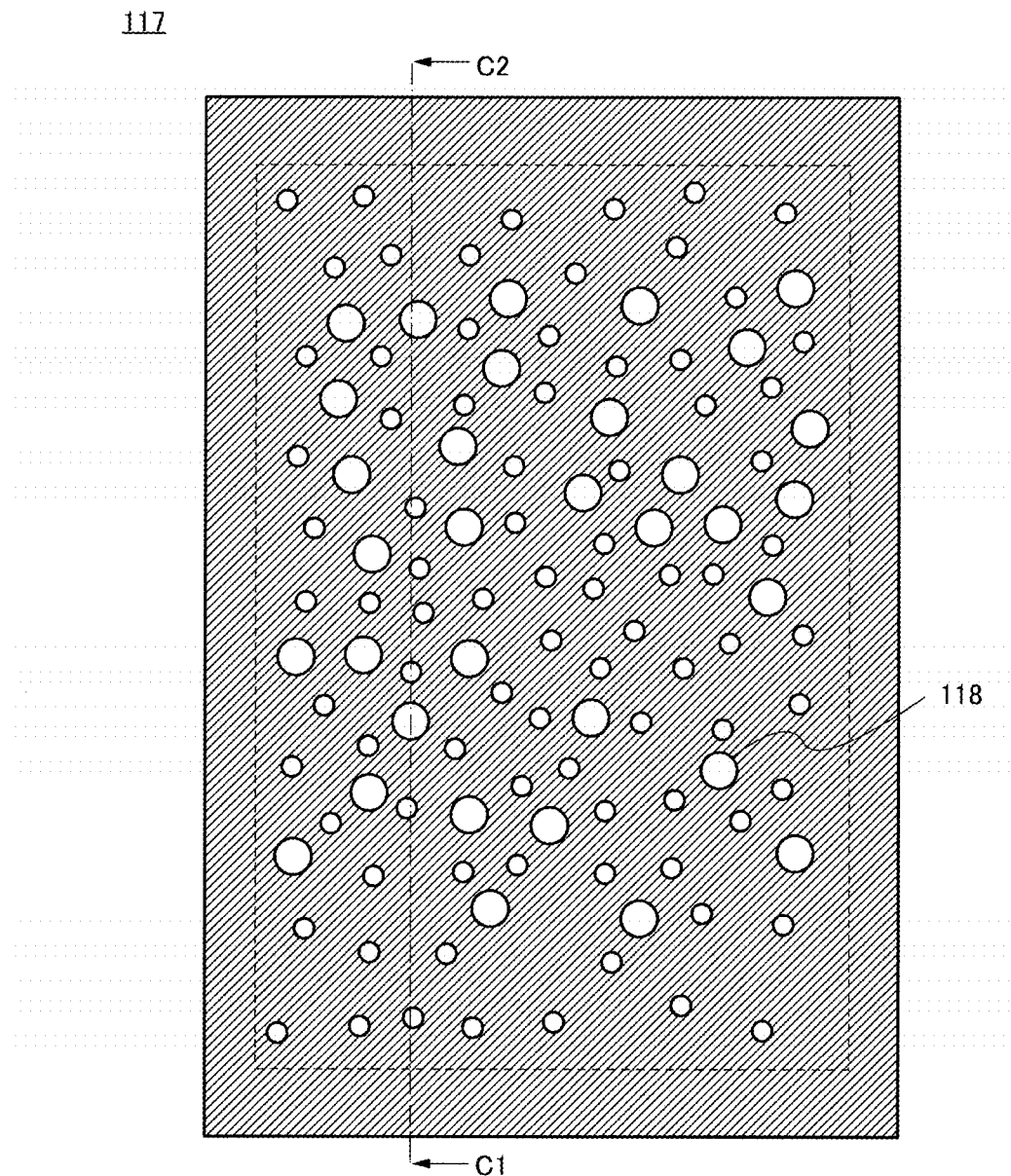
FIG. 6A is a plan view of a semi-transmitting reflective film.
Figure 6B:
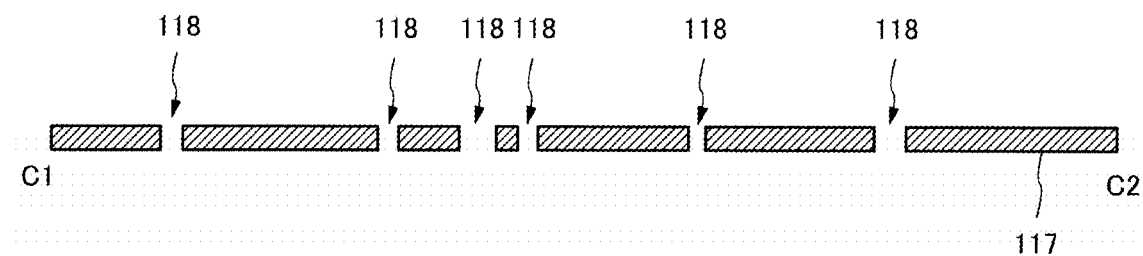
FIG. 6B is a cross-sectional view taken along a line C1-C2 of a semi-transmitting reflective film.

Alternatively, the reflectance and transmittance of the semi-transmitting reflective film 117 can be adjusted, for example, by providing a plurality of through holes in the semi-transmitting reflective film 117 and making the density of through holes different between the intermediate part of the light-emitting part 103 and the vicinity of the light source part 102a. FIG. 6A is top view of the semi-transmitting reflective film 117, and FIG. 68 is a cross-sectional view taken along a line C1-C2 of the semi-transmitting reflective film 117. When a through hole 118 provided in the semi-transmitting reflective film 117 is circular, the diameter of the through hole 118 is, for example, 5 μm or less. The diameters of the through holes 118 can be different as long as they are less than 5 μm. In the semi-transmitting reflective film 117, the area occupied by the through hole 118 per 1000 μm² in the intermediate part of the light guide area 114 is made to be larger than the area occupied by the through hole 118 per 1000 μm² in the vicinity of the light source part 102a. Alternatively, the diameters of the plurality of through holes 118 may all be the same. In this case, in the semi-transmitting reflective film 117, the density of the through hole 118 per 1000 μm² in the intermediate part of the light guide area 114 is made to be larger than the density of the through hole 118 per 1000 μm² in the vicinity of the light source part 102a. As a result, the reflectance and transmittance of the semi-transmitting reflective film 117 can be adjusted.

Figure 5A:
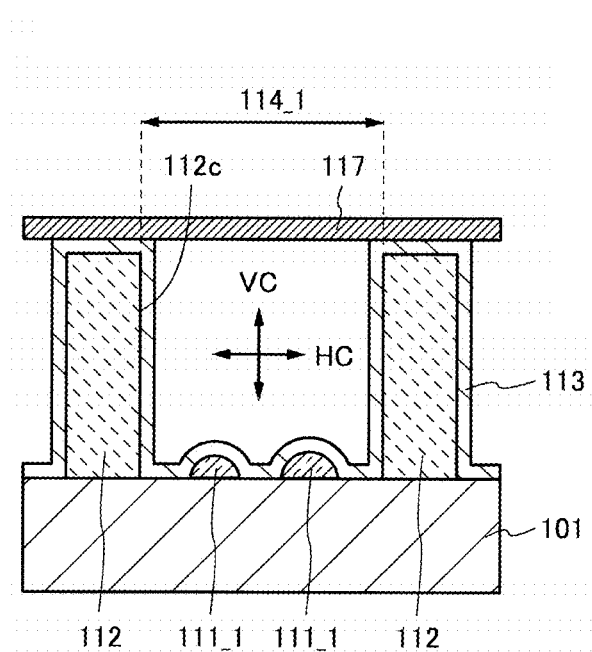
FIG. 5A is a cross-sectional view of a light guide area.
Figure 5B:
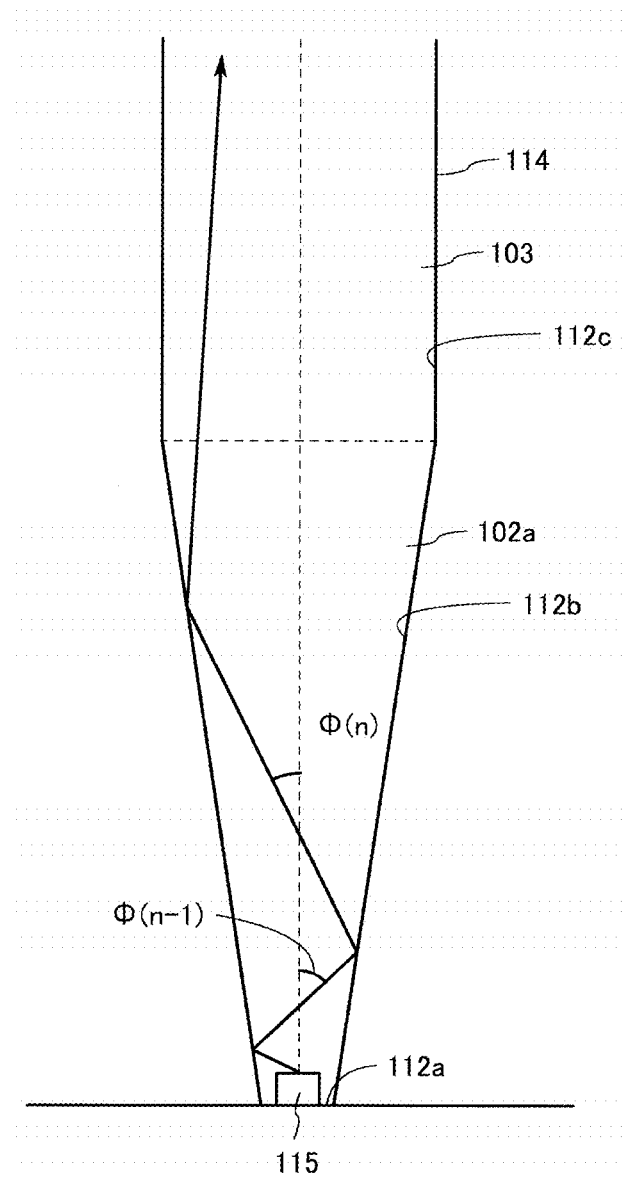
FIG. 5B is a plan view of a light guide area.

FIG. 5A and FIG. 5B are diagrams illustrating the optical path of the light emitted from the light-emitting element 115. FIG. 5A is a cross-sectional view of the light-emitting part 103, and FIG. 5B is a plan view of the light source part 102a and the light-emitting part 103. As shown in FIG. 5A, the light emitted from the light-emitting element 115 contains a light ray component HC that is parallel to the surface of the substrate 101 and a light ray component VC that is perpendicular to the surface of the substrate 101. The shape of the light source part 102a acts on the light ray component HC that is parallel to the surface of the substrate 101.

As shown in FIG. 5B, the light emitted from the light-emitting element 115 is repeatedly reflected on the side surface 112b of the partition 112 in the light source part 102b and proceeds to the light-emitting part 103. In FIG. 5B, the direction of the light ray component HC is indicated by an angle Φ formed between the light ray component HC and the first direction D1. If Φ after the n-th reflection is Φ(n), the relationship between Φ(n) and Φ(n−1) is |Φ(n)|=|Φ(n−1)−2θ|. That is, the direction of the light ray component HC approaches 2θ in the extension direction of the groove-like structure for each reflection, and reflection is not performed when |Φ(n)| is θ or less. When the light-emitting part 103 is sufficiently long, the light emitted from the light-emitting element 115 provided on the side surface 112a, |Φ(n)| becomes θ or less and is reflected by the protrusion 111 of the light-emitting part 103 and emitted to the outside. For example, even if the light is emitted from the side surface of the light-emitting element 115, by repeating more reflections in the light source part 102a, |Φ(n)| becomes θ or less.

On the other hand, although the perpendicular light ray component VC is repeatedly reflected between the bottom surface of the light source part 102a and the semi-transmitting reflective film 117, the bottom surface of the light source part 102a and the semi-transmitting reflective film 117 are parallel to each other, and the traveling direction of the light lay component VC does not change. The light having the light ray component VC close to the normal direction of the substrate 101 proceeds to the light-emitting part 103 while being repeatedly reflected between the bottom surface of the light source part 102a and the semi-transmitting reflective film 117 and is reflected by the protrusion 111 and is emitted to the outside. The light ray component of the light lay component VC close to the first direction D1 of the light-emitting part 103 is reflected by the protrusion 111 and is emitted from the light-emitting part 103 to the outside.

As described above, in the lighting device 100 according to an embodiment of the present invention, the light emitted from the light-emitting element 115 in the light source part 102a can be efficiently advanced to the light-emitting part 103 by the shape of the partition 112 in the light source part 102a and the highly reflective semi-transmitting reflective film 117. In the light-emitting part 103, the light emitted from the light-emitting element 115 can be reflected by the plurality of protrusions 111 and emitted from the semi-transmitting reflective film 117 to the outside by the plurality of protrusions 111 and the semi-transmitting reflective film 117 having high transmittance. Thereby, in the light source part 102a, it is possible to suppress the transmission of light from the semi-transmitting reflective film 117, and the light can be efficiently emitted from the light-emitting part 103. Therefore, the brightness of the lighting device 100 can be improved. In addition, since the leakage of the light from the light source part 102a can be suppressed, power consumption can be reduced.

Figure 7:
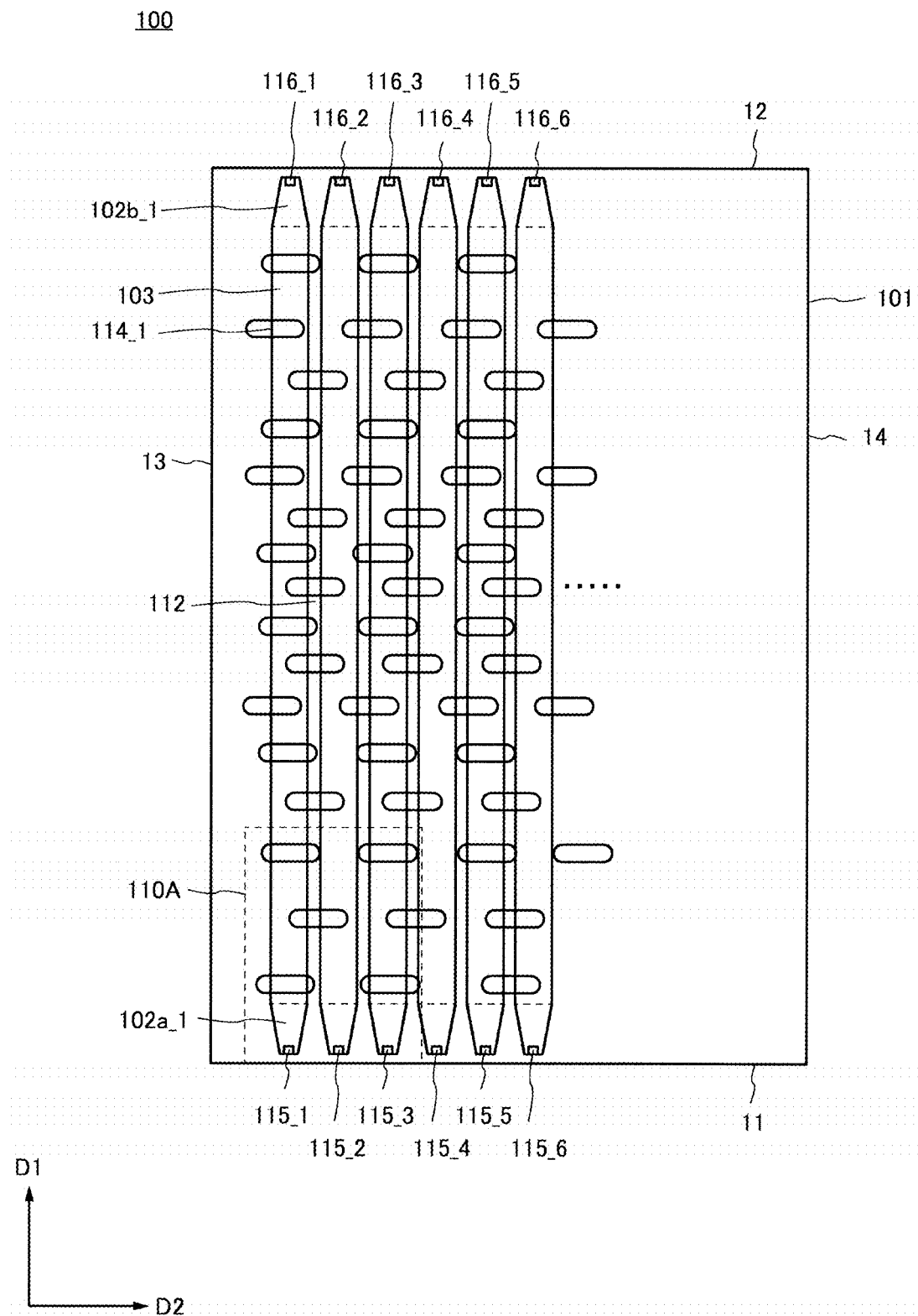
FIG. 7 is a plan view of a lighting device according to an embodiment of the present invention.

FIG. 7 is a plan view of a lighting device 100A according to an embodiment of the present invention. In the lighting device 100A, the shape of a protrusion 111A provided in the light-emitting part 103 is different from the protrusion 111. Specifically, the protrusion 111A has a linear convex configuration extending in the second direction D2 of the light guide area 114. A plurality of protrusions 111A is randomly distributed in the light-emitting part 103.

Figure 8:
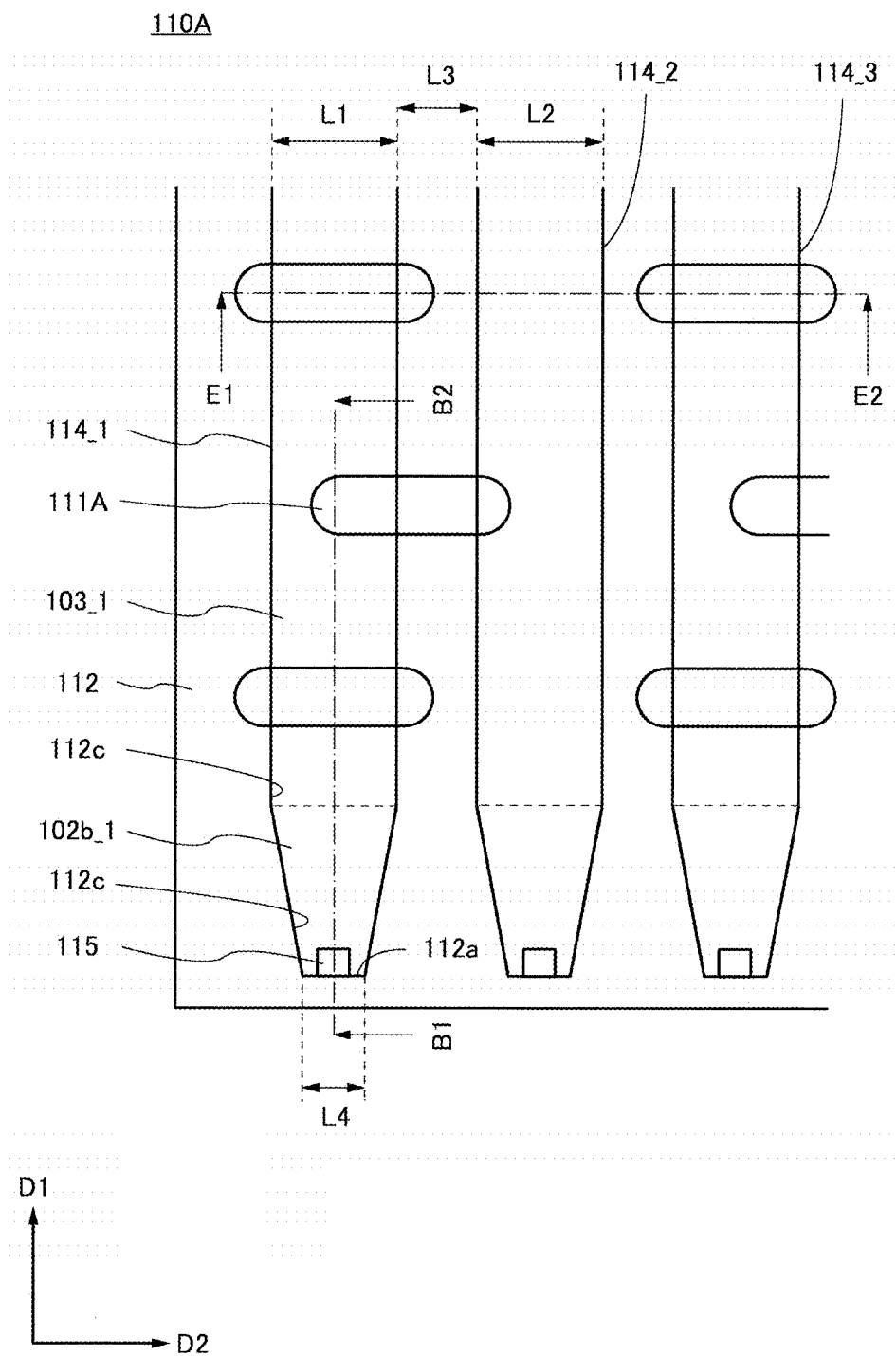
FIG. 8 is an enlarged view of a part of a lighting device according to an embodiment of the present invention.
Figure 9:
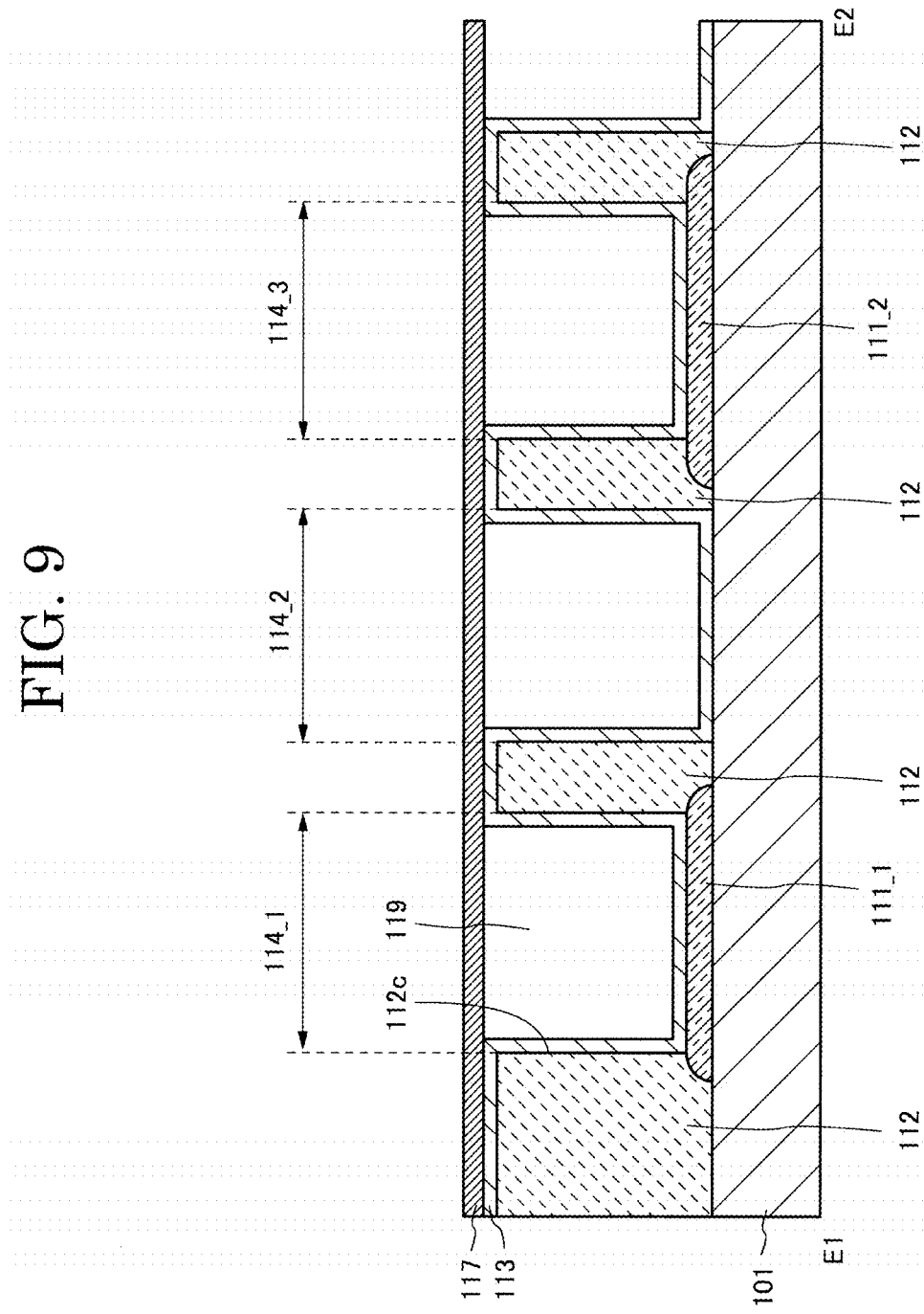
FIG. 9 is a cross-sectional view taken along a line E1-E2 of the lighting device shown in FIG. 8.

FIG. 8 is an enlarged view of a part 110A of the lighting device 100. FIG. 9 is a cross-sectional view taken along a line E1-E2 of the lighting device 100A shown in FIG. 8. Since the cross-sectional view taken along the line B1-B2 of the lighting device 100A shown in FIG. 8 is the same as the cross-sectional view shown in FIG. 4, a detailed description thereof will be omitted. As shown in FIG. 8 and FIG. 9, the length of the protrusion 111A in the second direction D2 may be longer than the width L1 of the light-emitting part 103. The length of the protrusion 111A in the second direction D2 is, for example, 10 μm to 200 μm. The protrusion 111A may overlap the partition 112. The cross-section of the protrusion 111A taken along the first direction D1 has the same curved surface as the protrusion 111 shown in FIG. 4. By this curved surface, the light emitted from the light-emitting element 115 can be reflected and emitted to the outside via the semi-transmitting reflective film 117.

In the lighting device 100A, it is preferable that the density of the plurality of protrusions 111A per 100 μm$^2$ is small in the region close to the light-emitting element 115, and the density of the plurality of protrusions per 100 μm$^2$ is high in the region further away from the light-emitting element 115. By making the density of the plurality of protrusions 111A in the region further away from the light-emitting element 115 higher than the density of the plurality of protrusions 111A in the region close to the light-emitting element 115, the emission intensity from the entire light-emitting part 103 can be made uniform. In the semi-transmitting reflective film 117, it is preferable to make the transmittance of the region further away from the light-emitting element 115 higher than the transmittance of the region close to the light-emitting element 115. Consequently, the light in the region close to the light-emitting element 115 is reflected by the semi-transmitting reflective film 117 and proceeds in the space 119 in the D1 direction. Thereafter, in the region further away from the light-emitting element 115, the light reflected by the protrusion 111 can be efficiently emitted from the semi-transmitting reflective film 117. Since the plurality of protrusions 111A is randomly distributed within the light guide area, even when applied to a display device having a regular pixel arrangement, it is possible to suppress the occurrence of moire.

<Manufacturing Method of Lighting Device>

Next, a manufacturing method of the lighting device 100 according to the embodiment of the present invention will be described with reference to FIG. 10 to FIG. 13.

Figure 10A:
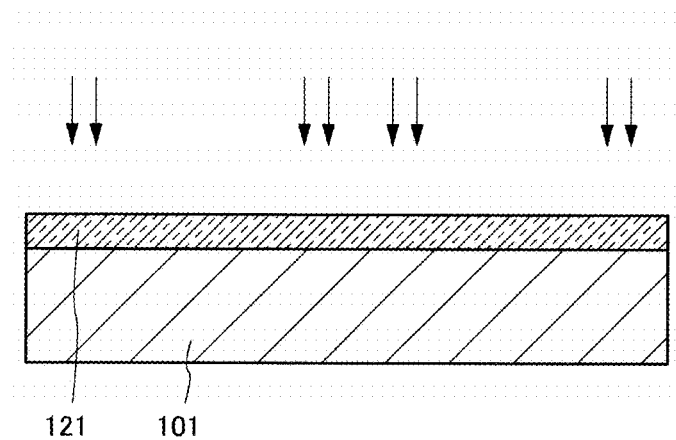
FIG. 10A is a cross-sectional view illustrating a manufacturing method of a lighting device according to an embodiment of the present invention.
Figure 10B:
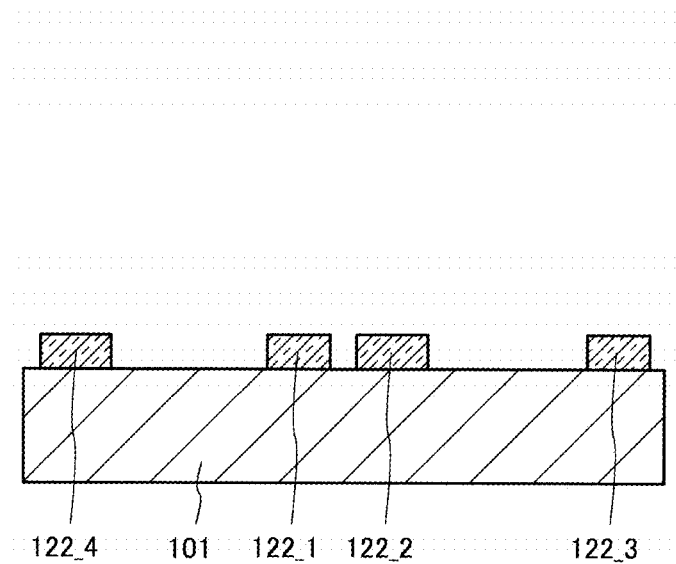
FIG. 10B, a cross-sectional view illustrating a manufacturing method of a lighting device according to an embodiment of the present invention.

First, as shown in FIG. 10A, a positive resist 121 is formed on the substrate 101 and irradiated with light except for a part where the plurality of protrusions 111 is to be formed. As shown in FIG. 10B, the positive resist 121 separated by regions other than parts 122_1 to 122_4 is removed.

Figure 11A:
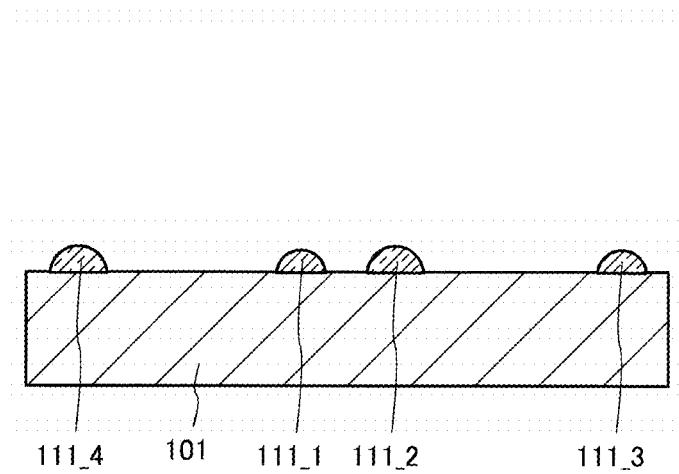
FIG. 11A is a cross-sectional view illustrating a manufacturing method of a lighting device according to an embodiment of the present invention.
Figure 11B:
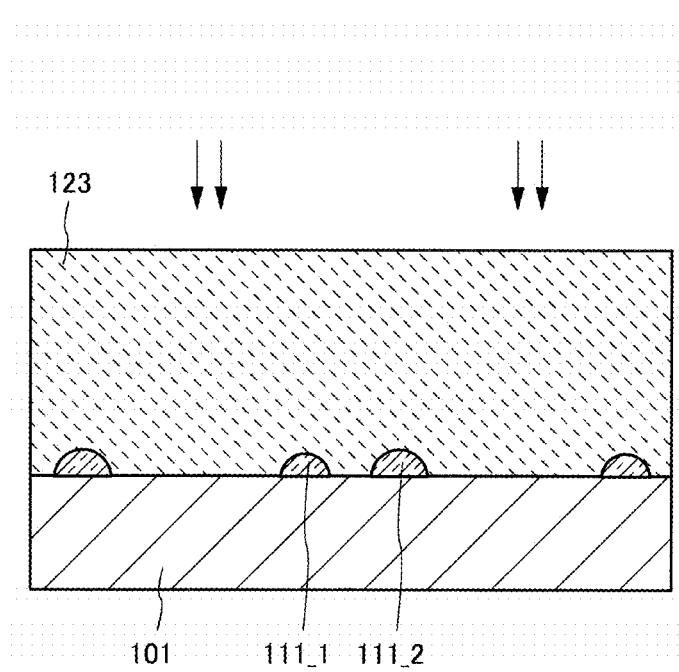
FIG. 11B is a cross-sectional view illustrating a manufacturing method of a lighting device according to an embodiment of the present invention.

Next, as shown in FIG. 11A, the positive resists 121 of the remaining parts 122_1 to 122_4 are melted and solidified to form meniscus-shaped protrusions 111_1 to 111_4. As shown in FIG. 11B, a thick film of a negative resist 123 is applied onto the substrate 101, and the part where the partition 112 is to be formed is selectively irradiated with light to polymerize the negative resist 123. A region surrounded by the partition 112 becomes the light guide area 114 on the substrate 101.

Figure 12A:
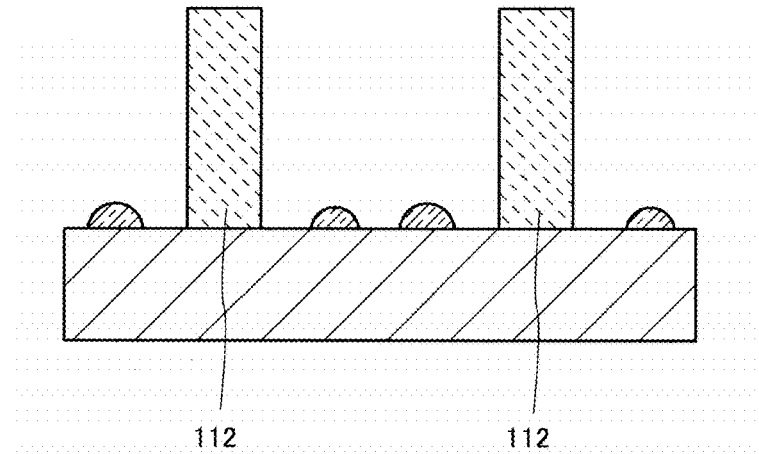
FIG. 12A is a cross-sectional view illustrating a manufacturing method of a lighting device according to an embodiment of the present invention.
Figure 12B:
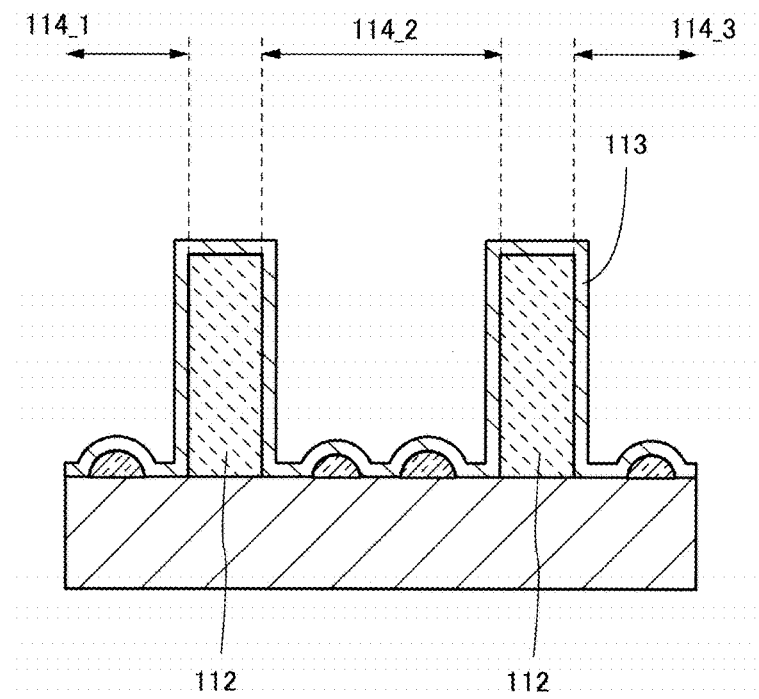
FIG. 12B is a cross-sectional view illustrating a manufacturing method of a lighting device according to an embodiment of the present invention.

Next, as shown in FIG. 12A, the partition 112 is formed by removing unreacted negative resists except for the part irradiated with light. The side surface of the partition 112 is provided to be preferably perpendicular to the surface of the substrate 101. The partition 112 is formed to have a height of 5 μm or more and 100 μm or less. The reflective film 113 is formed on the partition 112 and the plurality of protrusions 111 as shown in the substrate 101 in FIG. 12B. The reflective film 113 is formed using aluminum or silver or the like so as to have a thickness of 100 nm or more and 300 nm or less.

Figure 13:
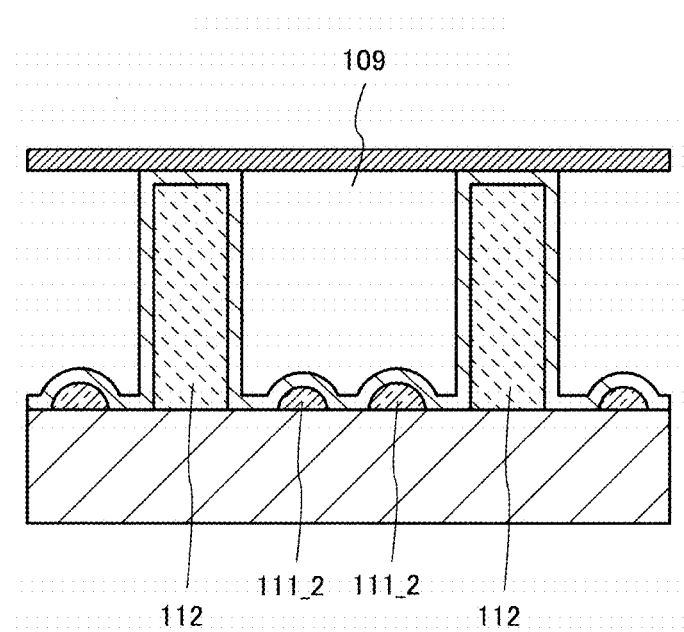
FIG. 13 is a cross-sectional view illustrating a manufacturing method of a lighting device according to an embodiment of the present invention.

Finally, as shown in FIG. 13, the semi-transmitting reflective film 117 is bonded to the partition 112. Consequently, the space 119 can be formed by the substrate 101, the partition 112, and the semi-transmitting reflective film 117. Through the above steps, the lighting device 100 according to the embodiment of the present invention can be manufactured.

In the lighting device 100 according to the present embodiment, although an example in which the light-emitting elements 115 and 116 are provided at both ends of the light guide area 114 has been described, an embodiment of the present invention is not limited to this example. For example, if the area of the lighting device 100 is small, the light source part 102a and light-emitting element 116 may be omitted, and the light-emitting element 115 may be provided only at one end of the light guide area 114.

Although an example in which the light-emitting elements 115, 116 are provided on the side surface 112a of the partition 112 has been described in the lighting device 100 according to the present embodiment, one embodiment of the present invention is not limited thereto. For example, the light-emitting element 115 may be provided on the bottom surface of the light source part 102a via the reflective film 113. The light emitted from the light-emitting element 115 may be reflected in the first direction D1 at the side surface 112a.

Second Embodiment

In the present embodiment, the case where the lighting device 100 described in the first embodiment is applied to a display device 300 will be described with reference to FIG. 14 to FIG. 17.

Figure 14:
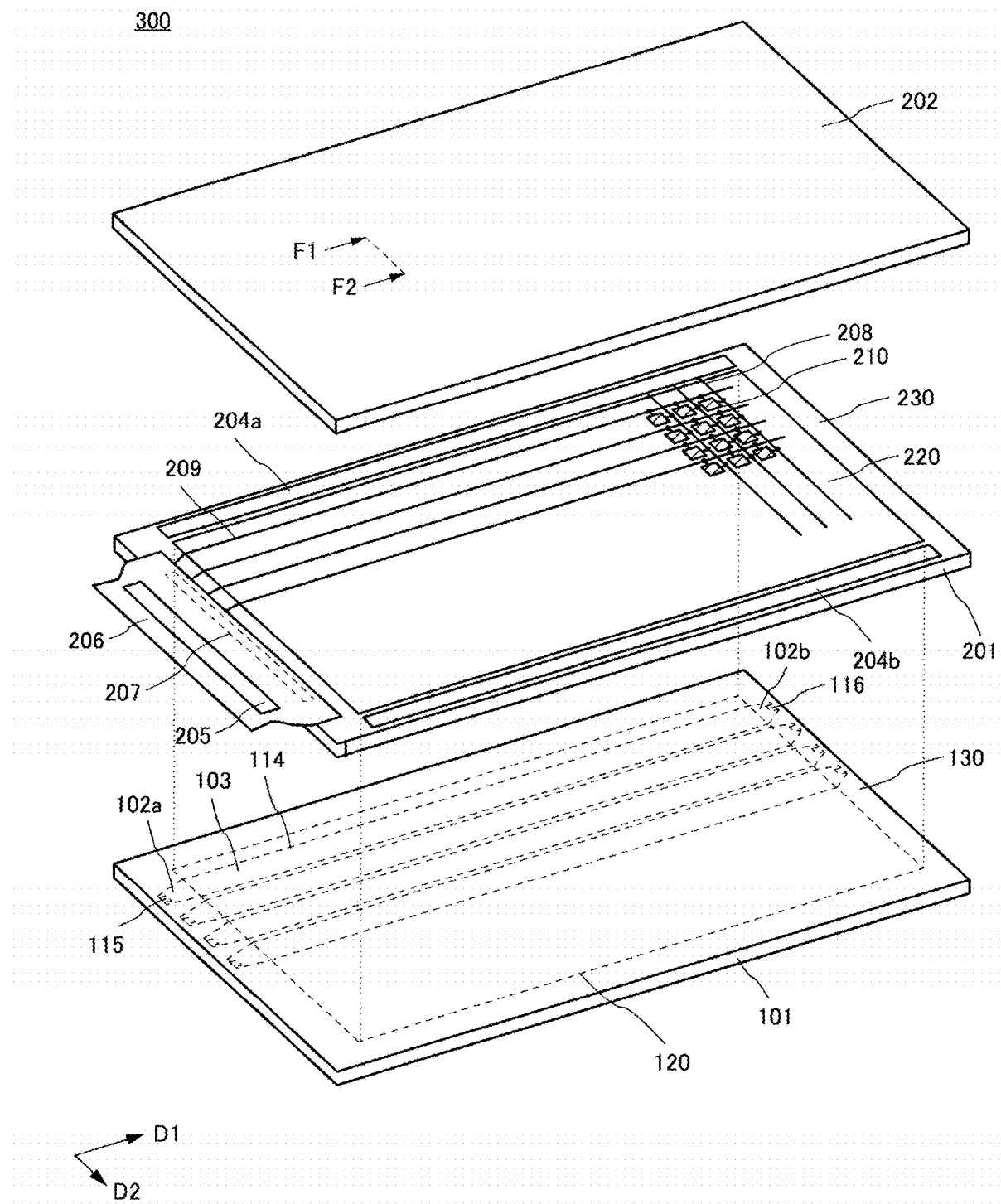
FIG. 14 is a development view of a display device according to an embodiment of the present invention.

FIG. 14 is a development view of the display device 300 according to an embodiment of the present invention. The display device 300 includes the lighting device 100 according to an embodiment of the present invention and a display panel 200 provided on the lighting device 100. For example, the case where a liquid crystal panel is used as the display panel 200 will be described.

The display panel 200 includes the substrate 101 including a display area 220 including pixels and a peripheral area 230 surrounding the display area 220, and a counter substrate 202 provided facing the substrate 101. The display area 220 includes a plurality of pixels 210 arranged in a matrix of M rows and N columns (M or N is a natural number).

Scan line drive circuits 204a, 204b and a terminal part 207 are provided in the peripheral area 230. A flexible printed board 206 is connected to the terminal part 207, and a driver IC 205 is provided on the flexible printed board 206. The scan line drive circuits 204a, 204b are circuits for selecting a row to be supplied with a scan signal corresponding to the gradation of each pixel 210. A gate line 208 extending in the second direction D2 is connected to the scan line drive circuits 204a, 204b. The driver IC 205 is electrically connected to a data line 209 extending in the first direction D1. The driver IC 205 supplies a sequential data signal to the pixel 210 in the row selected by the scan line drive circuits 204a, 204b. In the counter substrate 202, the surface provided facing the display area 220 is provided with a color filter. In the present embodiment, red, green, and blue color filters are arranged in stripes along the first direction D1.

As described in the first embodiment, in the lighting device 100, the plurality of light guide areas 114 extending along the first direction D1 is provided on the substrate 101. The partitions 112 are provided on the substrate 101 so as to surround each region of the plurality of light guide areas 114. The side surface of the partition 112 is provided so as to be substantially perpendicular to the surface of the substrate 101. The light guide area 114 includes the light-emitting part 103 and the light source parts 102a, 102b. As shown in FIG. 14, the light-emitting part 103 is a part where the width L1 in the second direction D2 intersecting the first direction D1 is constant. The light source part 102a is a part adjacent to the light-emitting part 103 and the width L1 decreases toward the side 11 of the substrate 101. The light source part 102b is adjacent to the light-emitting part 103 and the width L1 decreases toward the side 12 facing the side 11 of the substrate 101.

The light-emitting element 115 is provided in the light source part 102a. The light-emitting element 115 is provided in a part of the light source part 102a where the width in the second direction D2 is the smallest (width L2). The light-emitting element 115 is provided to irradiate the side surface 112a of the partition 112 in the light source part 102a with the first light of the first wavelength band in the first direction D1. The light-emitting element 116 is provided in the light source part 102b. The light-emitting element 116 is provided in a part where the width of the light source part 102b in the second direction D2 (width L2) is the smallest. The light-emitting element 116 is provided to face the light-emitting element 115. The light-emitting element 116 is provided to irradiate the side surface of the partition 112 in the light source part 102b with the first light of the first wavelength band in the third direction D3 opposite to the first direction D1. The light-emitting part 103 is provided with the plurality of protrusions 111. The plurality of protrusions 111 is provided at random in the light-emitting part 103. The arrangement of the plurality of protrusions 111 may be referred to in the first embodiment.

In the display device 300 according to an embodiment of the present invention, the light source part 102 in the lighting device 100 overlaps the peripheral area 230 of the display panel 200, and the light-emitting part 103 in the lighting device 100 overlaps the display area 220 of the display panel 200. One column of the pixels 210 of the display area 220 overlaps the light guide area 114. That is, one row of the pixels 210 for displaying a red color in the display area 220 overlaps the light guide area 114 so that the light emitted from the red light-emitting element 115 is incident. Another row of the pixels 210 for displaying green overlaps the light guide area 114 so that the light emitted from the green light-emitting element 115 is incident. Another row of the pixels 210 for displaying blue overlaps the light guide area 114 so that the light emission of the blue light-emitting element 115 is incident. The partition 112 of the lighting device 100 is provided between the adjacent pixels 210. As described above, the light emitted from the light-emitting element 115 corresponding to the emission color can be incident on each pixel 210 by arranging the lighting device 100. In this way, the light irradiated from the lighting device 100 is transmitted through the display panel 200 and is emitted to the outside.

Figure 15:
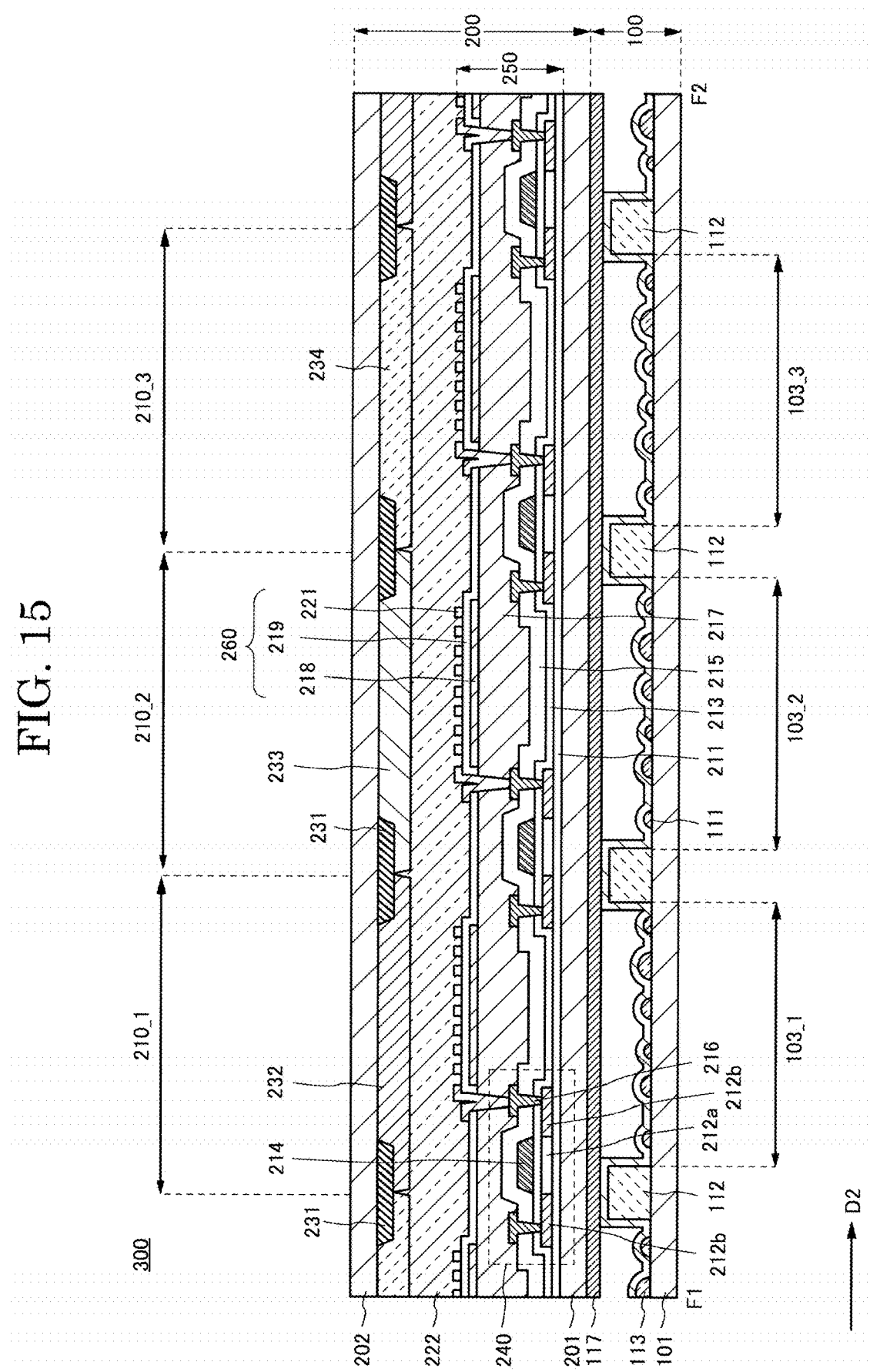
FIG. 15 is a cross-sectional view taken along a line F1-F2 of the display device shown in FIG. 14.

FIG. 15 is a cross-sectional view of the display device 300 taken along a line F1-F2. Although an example of applying a liquid crystal panel of an FFS (Fringe Field Switching) method will be described, an embodiment of the present invention is not limited to this example. For example, a liquid crystal panel of an TN method, a VA method, and a light-scattering method can be applied. An electrochromic display panel can be used as a display panel in place of a liquid crystal panel.

In the display panel 200, an element forming layer 250 and a liquid crystal layer 222 are provided between the substrate 201 and the counter substrate 202. The element forming layer 250 includes a transistor 240 and a display element 260. The transistor 240 is provided on a base film 211. The transistor 240 includes at least a semiconductor layer 212, a gate insulating film 213, a gate electrode 214, and a source electrode or drain electrode 216. An interlayer insulating film 215 is provided on the gate electrode 214, and the source electrode or drain electrode 216 is provided on the interlayer insulating film 215. The source electrode or drain electrode 216 is connected to the semiconductor layer 212 via an opening provided in the interlayer insulating film 215.

A planarization film 217 is provided on the interlayer insulating film 215, and the display element 260 is provided on the planarization film 217. The display element 260 includes a pixel electrode 218, an insulating film 219, and a common electrode 221. The pixel electrode 218 is electrically connected to the source electrode or drain electrode 216. In this case, light-transmitting transparent electrodes are used as the pixel electrode 218 and the common electrode 22.

The counter substrate 202 is provided with a black matrix 231. The black matrix 231 overlaps the partition 112 of the lighting device 100. Color filters 232, 233, and 234 are provided in openings of the black matrix 231. The color filters 232, 233, and 234 are arranged in stripes along the first direction D1 in the counter substrate 202.

A cross-sectional view of the light-emitting part 103 in the light guide area 114 of the lighting device 100 is shown. Each of light-emitting parts 103_1 to 103_3 is provided with the plurality of protrusions 111. The partition 112 is provided to surround the light guide area 114. The partition 112 is provided so as to be substantially perpendicular to the surface of the substrate 101. The reflective film 113 is provided so as to cover the entire substrate 101. The semi-transmitting reflective film 117 is provided so as to cover the light-emitting parts 103_1 to 103_1. The transmittance and reflectance of the semi-transmitting reflective film 117 may be referred to in the first embodiment. As shown in FIG. 15, the color filter 232 overlaps the light-emitting part 103_1, the color filter 233 overlaps the light-emitting part 103_2, and the color filter 234 overlaps the light-emitting part 103_3.

Figure 16:
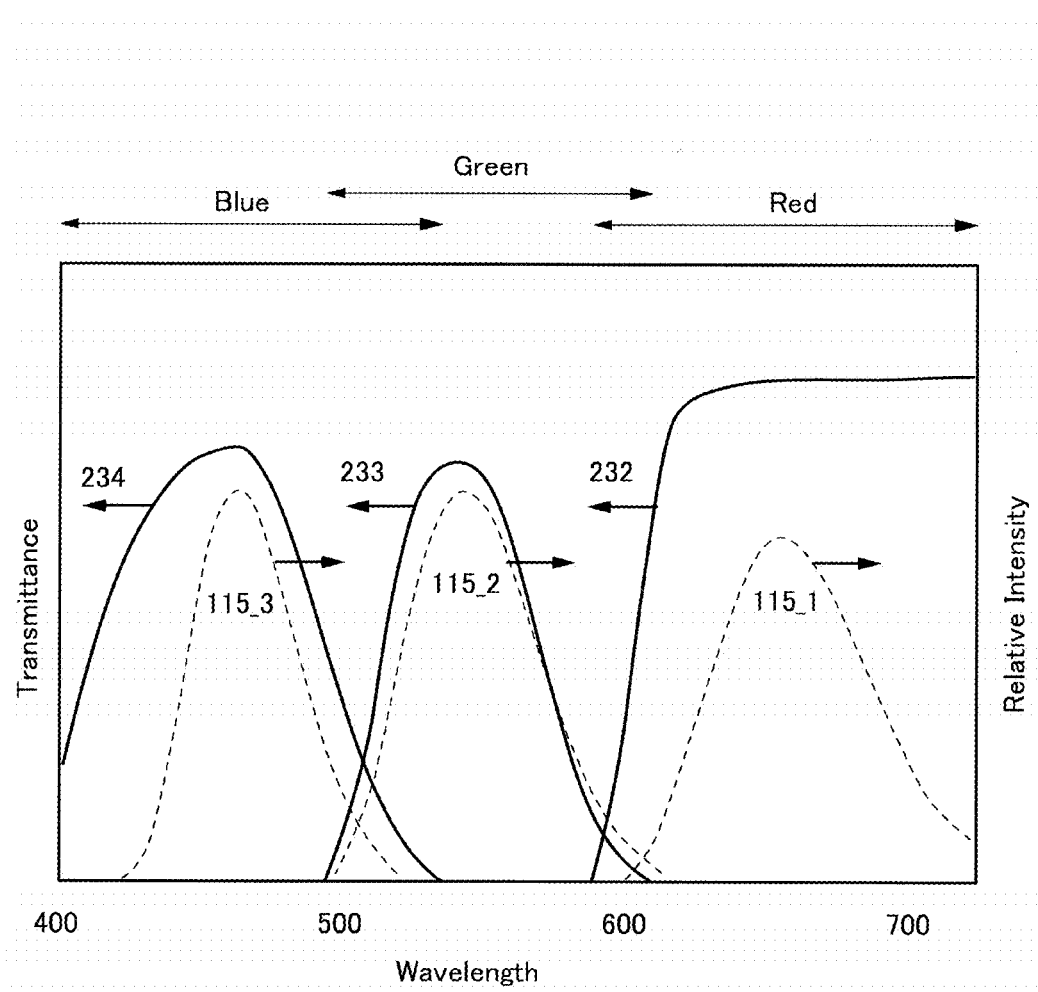
FIG. 16 is a diagram showing the emission spectrum of a light-emitting element and the transmittance spectrum of a color filter.

FIG. 16 is a diagram showing the emission spectrum of the light-emitting elements 115_1 to 115_3 and the transmittance spectrum of the color filters 232, 233, and 234. The color filter 232 has the maximum transmittance in the first wavelength band and transmits the first light emitted by the light-emitting element 115_1. The color filter 233 has the maximum transmittance in the second wavelength band and transmits the second light emitted by the light-emitting element 115_2. The color filter 234 has the maximum transmittance in the third wavelength band and transmits the third light emitted by the light-emitting element 115_3. As described above, the attenuation of the brightness due to the absorption of the color filters can be reduced by selectively irradiating the first light, the second light, and the third light, which have the maximum transmittance, respectively, in the respective wavelength bands of the color filters 232, 234, and 235. Therefore, by applying the lighting device 100 to the transparent display panel 200, it is possible to achieve high brightness and low power consumption. Since the emission colors of the light-emitting elements 115_1 to 115_3 are high color purities, the color filters 232, 233, and 234 may be omitted from the counter substrate 202. In this case, the manufacturing cost of the display device 300 can also be reduced.

By reflecting the light emitted from the light-emitting element 115 using the protrusion 111 provided in the light-emitting part 103, it is possible to achieve brightness having an in-plane uniformity. By using the semi-transmitting reflective film 117 having transmittance differing between the light-emitting part 103 and the light source parts 102a, 102b, it is possible to achieve brightness having a further in-plane uniformity. Since light leakage can be suppressed in the light source parts 102a and 102b, high brightness can be achieved.

In the present embodiment, although an example in which the lighting device 100 is configured using the light-emitting elements 115 of three colors of red, green, and blue has been described, an embodiment of the present invention is not limited to this example. For example, the lighting device 100 may be configured using the light-emitting element 115 of four colors of red, yellow, green, and blue. A light-emitting element 115_4 emits a fourth light of a fourth wavelength band different from the first wavelength band to the third wavelength band. The fourth wavelength band is 570 nm to 590 nm.

Figure 17:
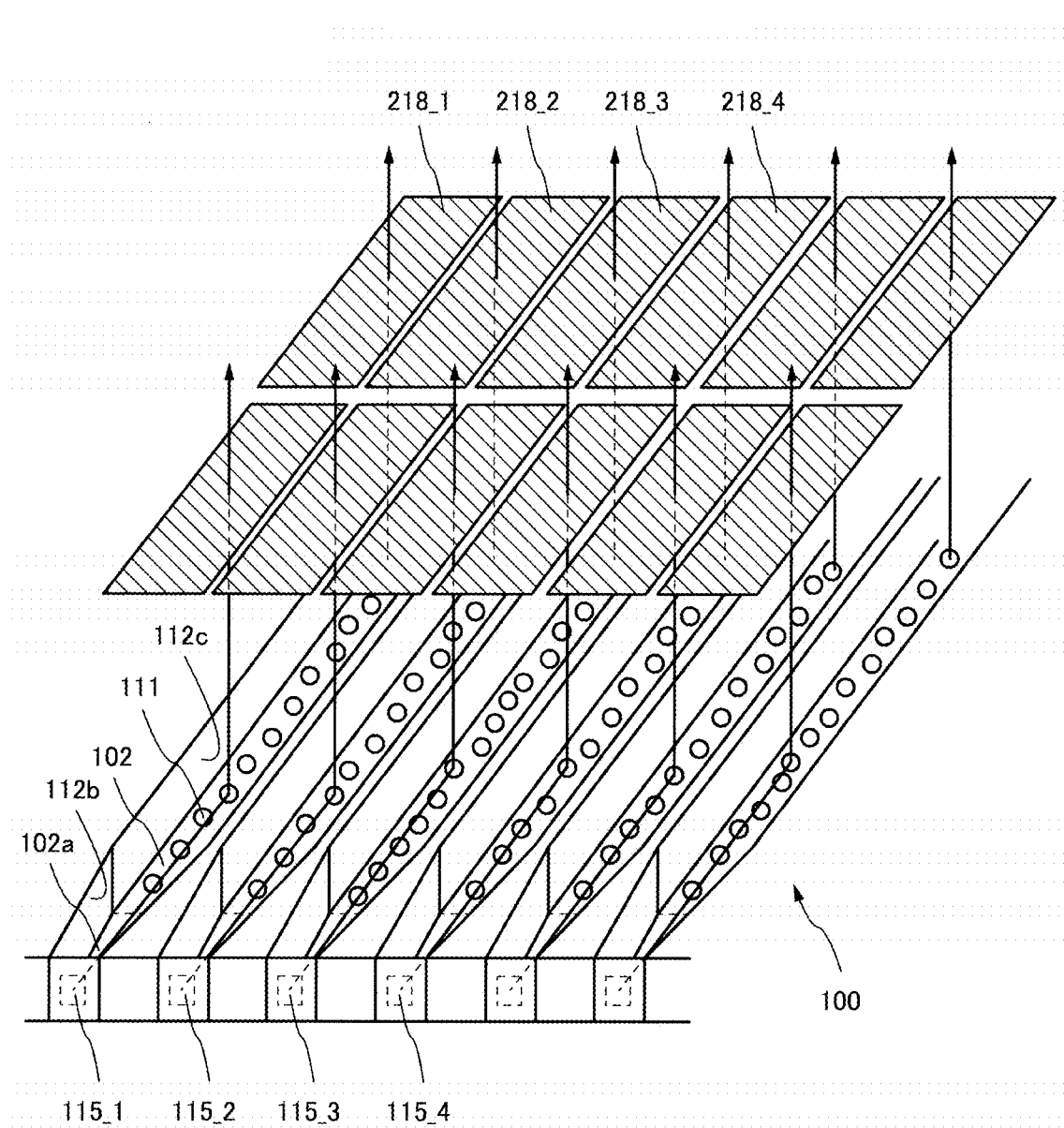
FIG. 17 is a schematic view of a display device according to an embodiment of the present invention.

FIG. 17 is a diagram showing a state in which the lighting device 100 and the pixel electrode 218 of the pixel 210 of the display panel 200 overlap. In this embodiment, the pixel electrode 218 is rectangular. In FIG. 17, in the lighting device 100, the light-emitting elements 115_1 to 115_4 of four colors of red, yellow, green, and blue are repeatedly arranged. The light-emitting element 115_1 is arranged so that the light of the light-emitting element 115_1 enters in a pixel electrode 218_1. With respect to the light-emitting element 115_4, the hue changes most abruptly in the vicinity of the wavelength range of 580 nm corresponding to yellow, and a slight hue change of yellow and its surrounding colors can be expressed.

Third Embodiment

In this embodiment, an example in which a large area lighting device 100B is configured by using a plurality of lighting devices 100 according to an embodiment of the present disclosure will be described with reference to FIG. 18 and FIG. 19.

Figure 18A:
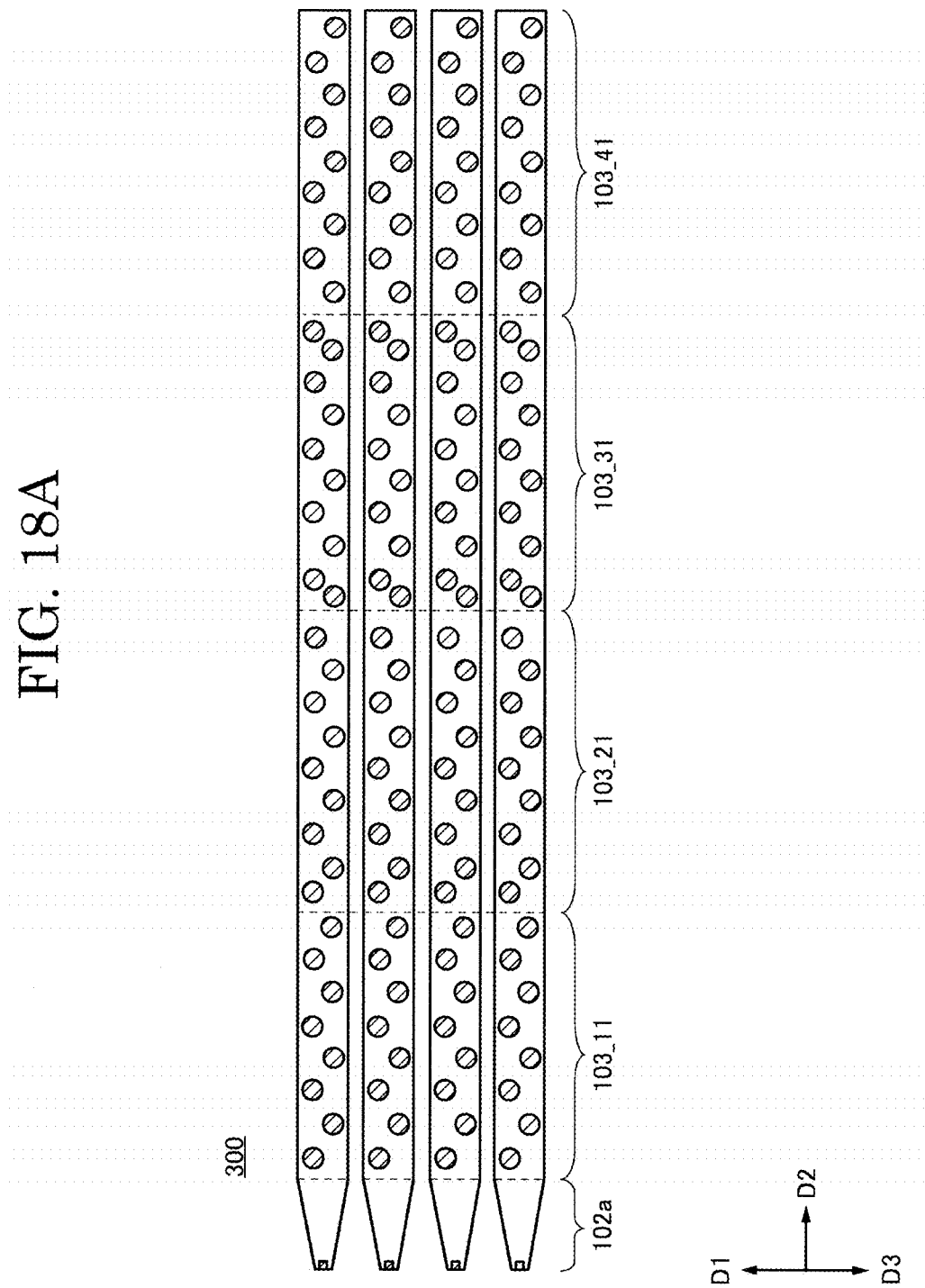
FIG. 18A is a plan view of a lighting device according to an embodiment of the present invention.
Figure 18B:
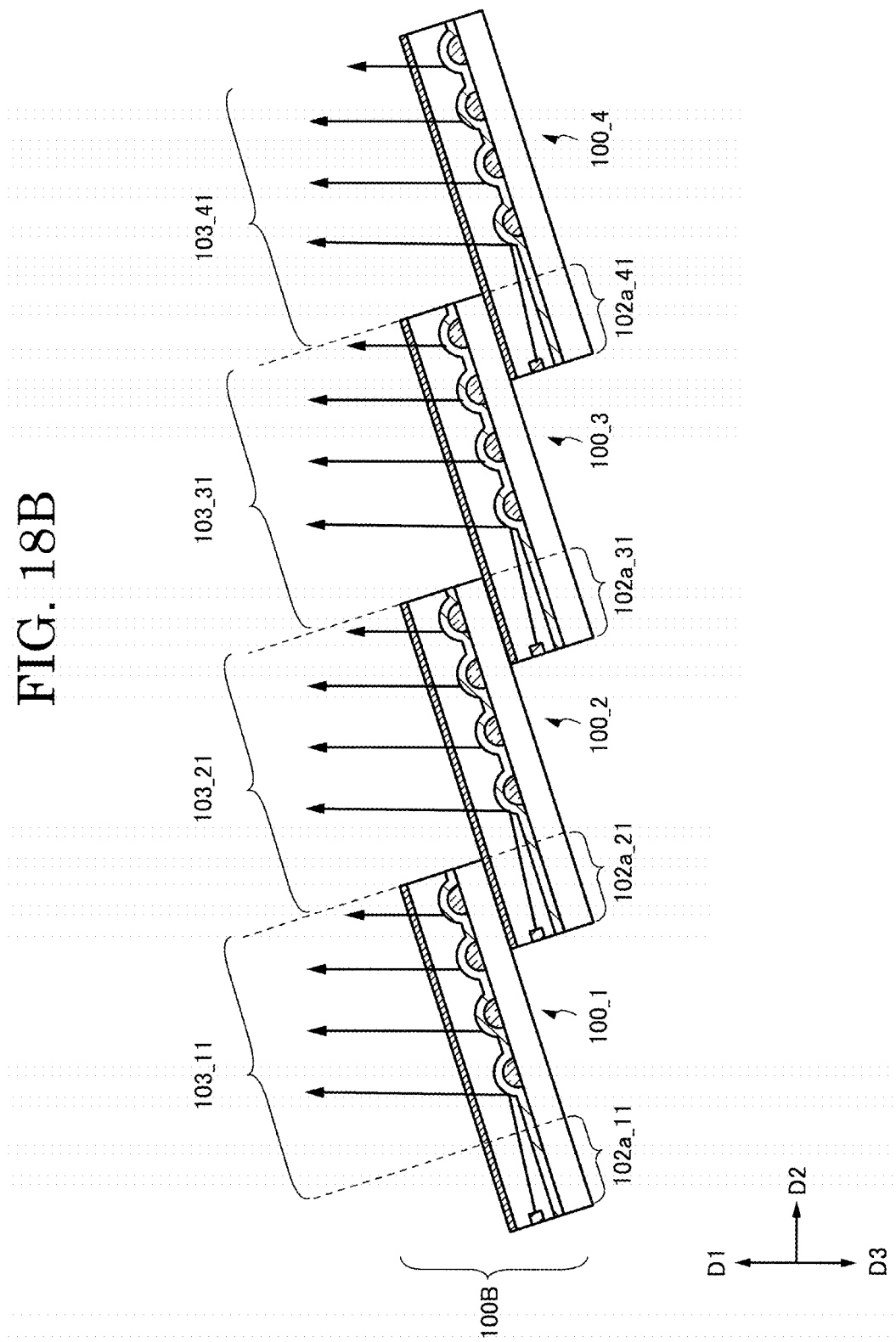
FIG. 18B is a cross-sectional view of a lighting device according to an embodiment of the present invention.

FIG. 18A is a plan view of the lighting device 100B according to an embodiment of the present invention. FIG. 18B is a cross-sectional view taken along a line E1-E2 of the lighting device 100B. The lighting device 100B includes a plurality of lighting devices 100_1 to 100_4. The plurality of lighting devices 100 are arranged so as to overlap the adjacent light source part 102 of the lighting device 100 in the second direction D2. For example, the lighting device 100_1 overlaps a light source part 102a_21 of the lighting device 100_2, the lighting device 100_2 overlaps a light source part 102a_31 of the lighting device 100_3, and the lighting device 100_3 overlaps a light source part 102a_41 of the lighting device 100_4.

As shown in FIG. 18B, by arranging the lighting devices 100_1 to 100_4, light-emitting parts 103_11, 103_21, 103_31, and 103_41 can be arranged continuously. By arranging the lighting devices 100_1 to 100_4 in this manner, it is possible to increase the area of the lighting device 100B. By arranging the lighting device 100 adjacently not only in the second direction D2 but also in the first direction D1 and the third direction D3, it is possible to further increase the area of the lighting device 100B. By applying such a lighting device 100B to a large area liquid crystal panel, a large area display device can be manufactured.

FIG. 19 is a diagram illustrating a display device 300A in which the lighting device 100B is applied to a large area display panel 200A. The transmissive display panel 200A is provided on the lighting device 100B. The detailed configuration of the display panel 200A is the same as that of the display panel 200 described in the second embodiment. One row of the pixels 210 in the display area 220 of the display panel 200 overlaps the light-emitting parts 103_11, 103_21, 103_31, and 103_41. The emission intensity of the plurality of lighting devices 100_1 to 100_4 included in the lighting device 100B can be adjusted according to the brightness displayed by the display panel 200A. Therefore, a bright image can be brighter, and a dark image can be darker so that a high-contrast image display can be obtained.

(Modification 1)

Figure 20:
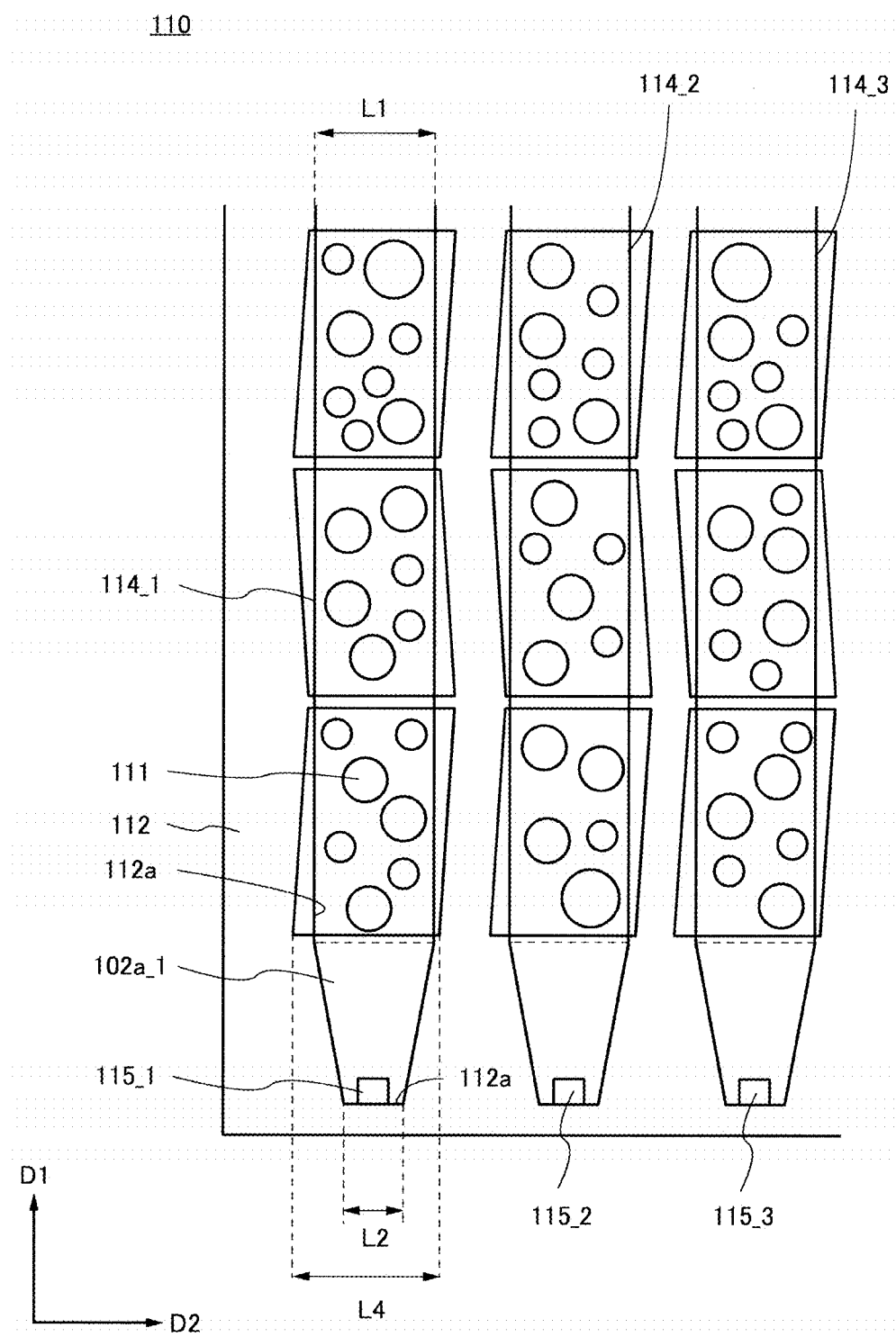
FIG. 20 is a diagram illustrating a positional relationship between a lighting device and a pixel electrode according to an embodiment of the present invention.
Figure 21:
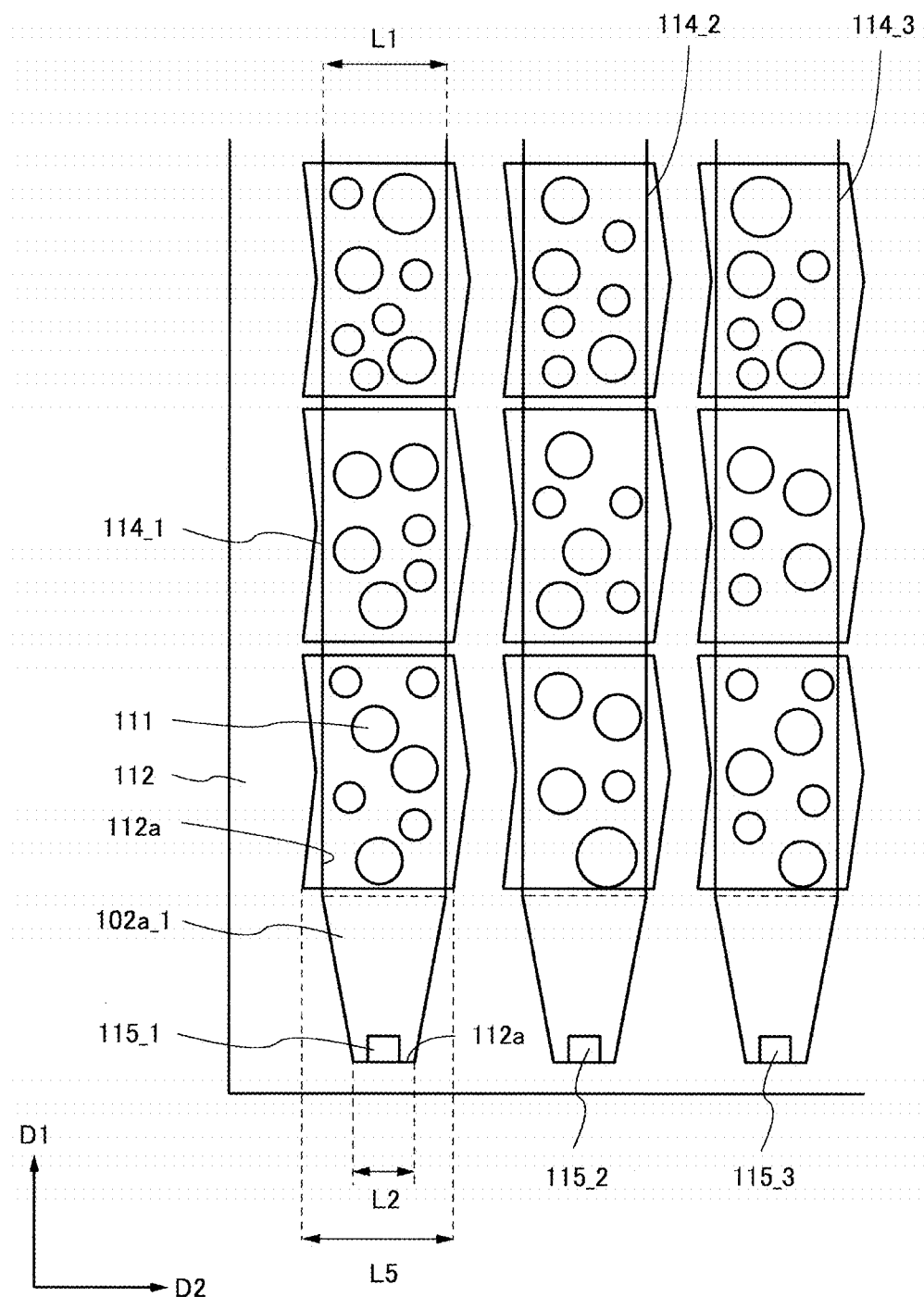
FIG. 21 is a diagram illustrating a positional relationship between a lighting device and a pixel electrode according to an embodiment of the present invention.

In the second embodiment, although it is described that the pixel electrode 218 is rectangular, the pixel electrode 218 may be another shape. A positional relationship between the lighting device 100 and the pixel electrode 218 will be described with reference to FIG. 20 and FIG. 21. FIG. 20 and FIG. 21 shows an exemplary combination of an IPS method or FFS method liquid crystal panel and the lighting device 100 according to an embodiment of the present invention.

FIG. 20 shows a pixel structure applied to a medium-sized liquid crystal panel, and FIG. 21 shows a pixel structure applied to a large-sized liquid crystal panel. In the IPS method or FFS method, a liquid crystal layer changes orientation so that it rotates in the plane direction when the liquid crystal panel is charged. At this time, since the retardation decreases in the viewing angle direction in the direction including the long axis direction of a liquid crystal molecule, the white display is tinged with blue, and the white display is tinged with yellow when the retardation increases in the direction including the short axis direction. Therefore, by combining a part where the liquid crystal molecules rotate clockwise and a part where the liquid crystal molecules rotate counterclockwise when an electric field is applied to the liquid crystal panel, coloring in the viewing angle direction is eliminated by additively mixing blue and yellow.

FIG. 20 is a diagram illustrating a positional relationship between the lighting device 100 and a pixel electrode 218A according to an embodiment of the present invention. FIG. 20 is a partially enlarged view of the lighting device 100, which is similar to the structure of the part 110 of the lighting device 100 shown in FIG. 2. In FIG. 20, pixel electrodes 218A_1 and 218A_2 are parallelogram. When a voltage is applied to the liquid crystal panel, the liquid crystal molecules rotate clockwise in the pixel electrode 218A_1 and the liquid crystal molecules rotate counterclockwise in the pixel electrode 218A_2. In this case, when the liquid crystal display device is in the white display state, when viewed from an angle, the pixel electrode 218A_1 and the pixel electrode 218A_2 having different parallelogram orientations are colored differently. As a result, the upper half and the lower half of a pixel electrode 218B compensate each other for the color change with respect to the viewing angle, so that the coloring can be reduced. As shown in FIG. 20, a width L4 of the pixel electrodes 218A_1, 218A_2 is preferably made to be larger than the width L1 of the light guide area 114_1. As a result, the transmittance of a surface emitting light source of the lighting device 100 can be controlled according to an image signal. Therefore, a decrease in the contrast ratio can be suppressed.

FIG. 21 is a diagram illustrating a positional relationship between a lighting device and a pixel electrode according to an embodiment of the present invention. FIG. 21 shows a partially enlarged view of the lighting device 100, which is similar to the structure of the part 110 of the lighting device 100 shown in FIG. 2. In FIG. 21, the pixel electrode 218B has a bent shape so as to divide one pixel. When a voltage is applied to the liquid crystal panel, the liquid crystal molecules rotate clockwise in the upper half of the pixel electrode 218B, and the liquid crystal molecules rotate counterclockwise in the lower half of the pixel electrode 218B. In this case, when the liquid crystal display device is in the white display state, when viewed from an angle, the upper half and the lower half of the pixel electrode 218B are colored differently. As a result, the upper half and the lower half of pixel electrode 218B compensate each other for the color change with respect to the viewing angle, so that the coloring can be reduced. As shown in FIG. 21, a width L5 of the pixel electrode 218B is preferably made to be larger than the width L1 of the light guide area 114_1. As a result, the transmittance of the surface emitting light source of the lighting device 100 can be controlled according to an image signal. Therefore, a decrease in the contrast ratio can be suppressed.

Within the scope of the present invention, a person skilled in the art may make various modifications and changes, and it is understood that these modifications and changes also belong to the scope of the present invention. For example, the addition, deletion, or design change of components, or the addition, deletion, or condition change of a process as appropriate by those skilled in the art based on each embodiment described above are also included in the scope of the present invention as long as they are provided with the gist of the present invention.

What is claimed is:

1. A lighting device comprising:
    a first light guide area sandwiched between partitions extending along a first direction;
    a first light emitting element emitting light in a first wavelength band; and
    a semi-transmitting reflective film covering the first light guide area,
    the first light guide area including:
        a first protrusion; and
        a reflective film covering the first protrusion and each side of the partitions,
    the first light guide area including:
        a first part having a constant first width in a second direction crossing the first direction; and
        a second part adjacent to the first part and the first width decreasing as it recedes from the first part,
    wherein
    the first light emitting-element is arranged in the second part.

2. The lighting device according to claim 1, further comprising:
a second light emitting element adjacent to the first part, wherein the first width decreases as it recedes from the first part and emitting light of the first wavelength band toward a third direction opposite to the first direction.

3. The lighting device according to claim 1, further comprising:
a second light guide area adjacent to the first light guide area in the second direction and sandwiched between the partitions extending along the first direction; and
a third light emitting element emitting light in a second wavelength band different from the first wavelength band,
the second light guide area including:
a second protrusion; and
a fourth part having a constant second width in the second direction; and
a fifth part adjacent to the fourth part and the second width decreasing as it recedes from the fourth part,
wherein
the third light-emitting element is arranged in the fifth part.

4. The lighting device according to claim 3, wherein the first projection extends from the first light guide area toward the second direction and is provided in the second light guide area.

5. The lighting device according to claim 1, wherein the sides of the partitions are substantially perpendicular to the bottom surface of the first light guide area.

6. The lighting device according to claim 1, wherein the semi-transparent reflective film has a lower second transmittance overlapping the second part than the first transmittance overlapping the first part.

7. The lighting device according to claim 6, wherein the semi-transparent reflective film is made of the same metal material as the reflective film, and a thickness of the first film overlapping the first part is smaller than a thickness of the second film overlapping the second part in the semi-transparent reflective film.

8. The lighting device according to claim 6, wherein the semi-transmitting reflective film is made of the same metal material as the reflective film, and a first area occupied by a through hole provided in a region of 100 $\mu m^2$ overlapping the first part is lower than a second area occupied by a through hole provided in the region of 100 $\mu m^2$ overlapping the second part.

9. A display device comprising:
a lighting device and a display panel provided on the lighting device,
the lighting device including,
a first light guide area sandwiched between partitions extending along a first direction;
a first light emitting element emitting light in a first wavelength band; and
a semi-transmitting reflective film covering the first light guide area,
the first light guide area including:
a first protrusion; and
a reflective film covering the first protrusion and each side of the partitions,
the first light guide area including:
a first part having a constant first width in a second direction crossing the first direction; and
a second part adjacent to the first part and the first width decreasing as it recedes from the first part,
the display panel including:
a second substrate having a display area including a first pixel and a peripheral area surrounding the display area; and
a third substrate provided opposite the display area of the second substrate,
wherein
the third light-emitting element is arranged in the fifth part,
the first part overlaps the display area, and
the second part overlaps the peripheral area.

10. The display device according to claim 9, further comprising:
a second light emitting element adjacent to the first part, the first width decreasing as it recedes from the first part, and emitting light of the first wavelength band toward a third direction opposite to the first direction.

11. The display device according to claim 9, further comprising:
a second light guide area adjacent to the first light guide area in the second direction and sandwiched between the partitions extending along the first direction; and
a third light emitting element emitting light in a second wavelength band different from the first wavelength band,
the second light guide area including:
a second protrusion; and
a fourth part having a constant second width in the second direction; and
a fifth part adjacent to the fourth part and the second width decreasing as it recedes from the fourth part.
wherein
the third light-emitting element is arranged in the fifth part.

12. The display device according to claim 11, wherein the first projection extends from the first light guide area toward the second direction and is provided in the second light guide area.

13. The display device according to claim 9, wherein the sides of the partitions are substantially perpendicular to the bottom surface of the first light guide area.

14. The display device according to claim 9, wherein the semi-transparent reflective film has a lower second transmittance overlapping the second part than the first transmittance overlapping the first portion.

15. The display device according to claim 14, wherein the semi-transparent reflective film is made of the same metal material as the reflective film, and a thickness of the first film overlapping the first part is smaller than a thickness of the second film overlapping the second part in the semi-transparent reflective film.

16. The display device according to claim 14, wherein the semi-transmitting reflective film is made of the same metal material as the reflective film, and a first area occupied by a through hole provided in a region of 100 $\mu m^2$ overlapping the first part is lower than a second area occupied by a through hole provided in the region of 100 $\mu m^2$ overlapping the second part.

17. The display device according to claim 9, wherein the third substrate is provided opposite the display area and has a first color filter transmitting light in the first wavelength band, and the first color filter overlaps the first part.

18. The display device according to claim 11, wherein the third substrate is provided opposite the display area and has a second color filter transmitting light in the second wavelength band, and the second color filter overlaps the fifth part.

* * * * *